US010198775B2

(12) United States Patent
Lobb et al.

(10) Patent No.: US 10,198,775 B2
(45) Date of Patent: Feb. 5, 2019

(54) ACCELERATION OF SOCIAL INTERACTIONS

(75) Inventors: Kenneth A. Lobb, Sammamish, WA (US); Shiraz J. Cupala, Seattle, WA (US); Omar Aftab, Kirkland, WA (US); Christopher Michael Novak, Redmond, WA (US); Todd Garnet Wagner, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 12/821,984

(22) Filed: Jun. 23, 2010

(65) Prior Publication Data

US 2011/0320536 A1 Dec. 29, 2011

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC .................................................... H04L 12/588
USPC .................................................. 709/204, 205
See application file for complete search history.

(56) References Cited

U.S. PATENT DOCUMENTS

2003/0225833 A1 12/2003 Paul et al.
2005/0075917 A1* 4/2005 Flores et al. ...................... 705/8
2005/0262542 A1 11/2005 Toby et al.
2007/0156664 A1* 7/2007 Norton et al. .................... 707/3
2008/0086431 A1* 4/2008 Robinson ................ A63F 13/12 706/11
2008/0133336 A1* 6/2008 Altman .............. G06Q 30/0207 455/456.1
2009/0313299 A1* 12/2009 Bonev .................. G06Q 10/109
2009/0319288 A1* 12/2009 Slaney ................... G06Q 10/10 705/1.1

(Continued)

FOREIGN PATENT DOCUMENTS

| | | |
|---|---|---|
| CN | 101271559 A | 9/2008 |
| CN | 101291341 A | 10/2008 |
| WO | 2009079808 A1 | 7/2009 |

OTHER PUBLICATIONS

Amendment dated Jun. 4, 2014, European Patent Application No. 11798641.4 filed Jun. 24, 2011.

(Continued)

*Primary Examiner* — Wing F Chan
*Assistant Examiner* — Andrew Woo
(74) *Attorney, Agent, or Firm* — Mike Cicero; Jacob P. Rohwer; Newport IP, LLC

(57) ABSTRACT

A system and method for facilitating social interactions between different individuals. Information available about each of the individuals engaged in a social interaction is used to provide a "social accelerator" for an interaction between the individuals. Social interactions are improved or accelerated by aggregating available information about individuals participating in an information system. When an interaction event trigger is received, the context of context for possible social interaction between the users around the trigger event is determined. A social accelerator is selected from available interest information common to the participating user and the target user, and the social accelerator is provided to one of the individuals.

26 Claims, 22 Drawing Sheets

(56) References Cited

U.S. PATENT DOCUMENTS

| | | | | |
|---|---|---|---|---|
| 2011/0125844 A1* | 5/2011 | Collier | H04L 12/2602 | 709/204 |
| 2011/0185020 A1* | 7/2011 | Ramamurthy | G06Q 10/10 | 709/204 |
| 2011/0246574 A1* | 10/2011 | Lento | G06Q 10/10 | 709/204 |
| 2011/0246907 A1* | 10/2011 | Wang | G06Q 30/0224 | 715/751 |

OTHER PUBLICATIONS

Supplementary European Search Report dated Feb. 6, 2014, European Patent Application No. 11798641.4.

Examination Report dated Feb. 19, 2014, European Patent Application No. 11798641.4.

"First Office Action Issued in China Patent Application No. 201180030849.8", dated May 11, 2015, 12 Pages.

"Second Office Action Issued in Chinese Patent Application No. 201180030849.8", dated Jan. 29, 2016, 13 Pages.

Response to First Office Action filed Sep. 26, 2015 in Chinese Patent Application No. 201180030849.8, with partial English translation, 13 Pages.

Decision to Refuse dated Jun. 10, 2016 in European Patent Application No. 11798641.4, 12 Pages.

"Third Office Action and Search Report Issued in Chinese Patent Application No. 201180030849.8", dated Jul. 6, 2016, 10 Pages.

Notice on Grant of Patent Right for Invention dated Jan. 19, 2017 in Chinese Patent Application No. 201180030849.8, 4 Pages.

Response to Office Action filed Aug. 12, 2016 in Chinese Patent Application No. 201180030849.8, 12 Pages.

* cited by examiner

ACCELERATION OF SOCIAL INTERACTIONS

BACKGROUND

People interact in a variety of ways, both in person and through virtual communications. Interactions can be one on one, or in groups, and surround an event or a common location, or be dispersed. The chance for a positive social interaction is generally better where more information is known about individuals with whom you are interacting. Often, it is not possible to remember relevant information about people one interacts with. In other cases, one is placed in social situations where little is known about others with whom you are in the social situation.

Many individuals have access to processing devices in social situations. These devices carry personal information about themselves and other individuals, and have access to published information about other individuals via a network.

SUMMARY

The technology, briefly described, comprises a system and method for facilitating social interactions between different individuals. Information available about each of the individuals engaged in a social interaction is used to provide a "social accelerator" for an interaction between the individuals. The social accelerator may comprise information about one or more of the individuals in the social interaction, such as a common interest or common historical event, which makes the social interaction more comfortable for the individuals. The accelerator can be provided before or during the event, and multiple accelerators may be provided as needed to improve social interactions.

In one embodiment, social interactions are improved or accelerated by aggregating available information about individuals participating in an information system. When an interaction event trigger is received, the context for possible social interaction between the users around the trigger event is determined. A social accelerator is selected from available interest information common to the participating user and the target user, and the social accelerator is provided to one or both of the individuals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
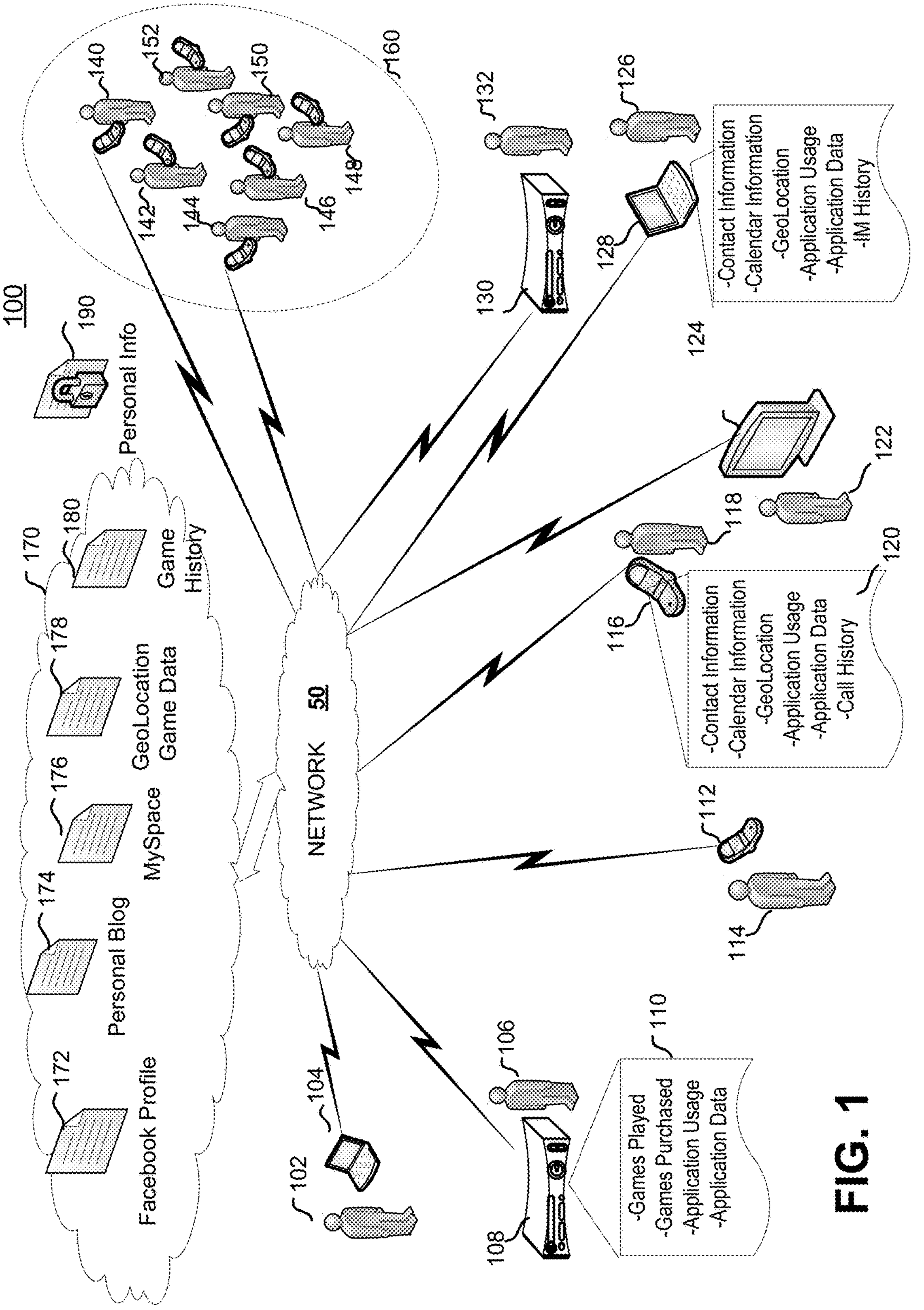
FIG. 1 depicts a system in which the technology discussed herein may be utilized.

Technology is presented for accelerating social interactions between different individuals. The social interactions may be real world, on-line or virtual, and may be within the individuals' physical presence or over distances. In these real world, on-line or virtual interactions, individuals may have associated with them a processing device, but the technology is not limited to enabling social interaction only with individuals having associated processing devices. Where two individuals are engaged in a social interaction, the technology can assist an individual with a processing device in improving or "accelerating" the social interaction experience. The technology utilizes any information available about each of the individuals engaged in a social interaction to provide a "social accelerator." The social accelerator may comprise information about one or more of the individuals in the social interaction, such as a common interest or common historical event, which makes the social interaction more comfortable for the individuals. The accelerator can be provided before or during the event, and multiple accelerators may be provided as needed to improve social interactions. The accelerator may be provided to individuals, a sub-group within a larger group of individuals, or all members of a group.

A social accelerator comprises information, activities or other events about one or more of the individuals in a social interaction which increases the comfort of the interaction between the parties. Various examples of social accelerators are described herein. Generally, a social accelerator is an information pivot about which a social interaction may occur. A social accelerator may be a common interest, important background information about the individuals, facts about one individual or many individuals that the other individuals may find interesting, or news about common interests. For example, if two individuals like the game Halo® and a new Halo® tournament winner is announced, such news may comprise a accelerator. An accelerator may also present information about the group overall, such as their interests, interesting facts about their game performance, and the like.

Social challenges exist in any conversation event or activity. Challenges are greater in situations where people understand little about one another and may be less willing to broadcast details about themselves to a random group. The technology address how people can be matched together in a way that they find themselves amidst people talking about subjects they care about or find interesting.

The technology uses known data, queries, events (triggers), and information from user applications to foster conversations which are more comfortable and provide deeper interaction amongst a group of people. Accelerators can be leveraged to group people (from a larger group) together better, to provide topics for an established group to discuss, and to prevent socially awkward situations.

In the context of the technology, accelerators may be provided automatically or upon request by an individual. Individuals requesting a social accelerator may be referred to as requesting individuals while those about whom an accelerator is requested may be referred to as target users. Participating users may be considered individuals who utilize one or more of the interaction technologies discussed herein to receive social accelerators. Target users may be participating users, or may be individuals about whom public information is available via a network data source.

Social accelerators may be provided by specific applications designed to provide accelerators and operating on user processing devices, or may be provided to user processing devices by a system platform via one or more existing notification technologies provided in the user processing device. For example, social accelerators may be provided to mobile devices using one or more standard technologies commonly present in the mobile device, such as SMS messaging or voice call technology. Accelerators may be provided to game consoles using "toast" messaging overlays built into the console interface. An application designed to provide accelerators may be specifically designed for the purpose of providing accelerators' (e.g. a dedicated client for a processing device) or may be implemented as part of another device application, such as a game. For instance, once all players land in a game lobby, the game will call for an accelerator and then present the result to the group via a game UI.

FIG. 1 is an overview of a system and situations in which social accelerators may be utilized. FIG. 1 shows a plurality of individuals 102, 106, 114, 118, 122, 126, 132, 140, 142, 144, 146, 148, 150, 152 any one or more of which is engaged in a social relationship with one of the other individuals depicted in FIG. 1. Individuals may have associated with them one or more processing devices. For example, user 102 has associated with him a notebook computer 104, user 106 has associated with her a gaming console 108, user 118 has associated with her a mobile device 116 and user 122 has associated with him a television 124. Each of the devices illustrated in FIG. 1 may be coupled to each other via one or more public or private networks 50, which may include the Internet, cellular networks, or any other type of known public or private data and/or voice transfer network. Each of the devices may further have access to cloud based information 170. Cloud based information 170 includes public and/or private information about any of the individuals depicted in FIG. 1 and stored on a network accessible data store which is available via network 50. For example, public information may include a Facebook® profile 172, a personal web log 174, a My Space® profile 176, geo location presence 178, and gaming history 180. Additional cloud information 170 may further include private data 190 accessible via the cloud, wherein the private data 190 may include things such as purchasing records, banking history, and purchase transaction history via any other number of known vendors. In one embodiment, private data 190 is only accessible based on authorized access by the owner of the private data. Where private data is used in the present system, the user may authorize one or more of the technologies discussed herein to access all or selected portions of the private data to enable the functionality described herein.

In-person personal interactions which may occur between individuals in FIG. 1 may include, for example, individuals 140, 142, 144, 146, 148, 150, 152 engaged in an event 160, such as a party. An event 160 may be known event, which is included on any one or more of the users 140-152 calendar, or an unknown event, which is not available via the users calendar or event record. Events 160 may also include various types of social gatherings such as concerts, sporting events, theater events, movies, or any type of event which places the users in a similar location at a similar time. Events 160 may comprise on-line or virtual events where a group of individuals are gathered for a common purpose as discussed below.

Each of the various types of processing devices may access the cloud based information 170, and may also have different types of information associated with the user stored locally on the device. For example, a gaming console 108 may include information 110 such as a history of games played, a history of games purchased, a history of which applications are played most by user 106, and application data, such as achievements, awards, and recorded sessions. A mobile device 116 may include information 120 such as contact information, calendar information, geo location information, application usage data, application specific data, and a user's messaging and call history. A notebook computer, such as notebook 128, may include items such as contact information, calendar information, geo location information, application usage, application data, and message history for an associated user 126.

In addition to in-person social interactions, users can engage in social interactions in virtual space or via electronic communication. For example user 106 may engage in an online game with user 132. In the game, the users may interact not only by playing the game, but also by verbal or messaging communications between them. Similarly, user 118 via mobile device 116 may simply make a phone call to user 114 on mobile device 112. User 102 via notebook 104 may communicate via e-mail, instant messaging, or other applications with user 126 on a notebook 128. Virtual interactions need not be conducted between the same devices. Users may engage in a virtual space gathering via a group chat service such as Xbox LIVE® Party Chat. Each of these interactions—a call, a chat, an email, an in-person experience—is augmented by the social interaction technology to induce conversation between the participants based on at least one common shared interest.

As described below, social accelerators used for the various personal and virtual social interactions between the various users illustrated in FIG. 1 can generally be classified into one of a number of cases. A first case is a group catalyzer social accelerator. In a first scenario, a group of users is attending an in-person or virtual space group event. In this case, user have likely already gathered for a common purpose—a party, an concert or the like, and social accelerators are use to find different points of interest other than the common event. When attending such an event, one or more users attending may not know enough information to feel comfortable interacting with other users at the event. Thus, a social accelerator may help to catalyze members of an existing group and promote social interaction between different members of the group who do not already know each other or have only limited knowledge of others attending the event.

A second case for the use of social accelerators is to prevent awkward situations between users. In this case, a user participating in a social interaction with another user may wish to avoid any awkwardness in the social interaction. Supposed, for example, a user receives a phone call from another individual with whom he has not spoken in some time, and cannot remember the calling party's personal information, such as family information and the calling party's birthday. A social accelerator, such as providing the calling individual or family member's impending birthday information, can be used to help prevent an awkward situation between the parties during the call.

A third case is the use of social accelerators to directly match people in virtual or in-person relationships to create new groups and promote interaction between the new members. In a matching case, social accelerators can be used to provide matching topics of interest, commonalities, social interaction points upon which two or more individuals may begin a social interaction, such as a conversation. However, the people matching context need not surround a particular event or proximal relationship, but may help users avoid uncomfortable situations where they are in a social interaction or group where there is limited or no knowledge of other users around them. In the matching context, it is likely that a fewer number of strong common interests would bring together a group. In one aspect, the technology is used to select a smaller set of people from a larger group where the smaller set is selected based on a common accelerator. In one example, the matchmaking over a larger social and gaming environment such as Xbox LIVE® scenario may be provided. For example, if a large number of, for example, 10,000 users are looking for a match in a particular game, the present technology may provide a small set (for example 10 users) that we think have things they would enjoy discussing—things in addition to the game they are playing.

Any number of other potential acceleration cases exist, and those used as examples herein should not be construed as limiting. The technology when presented herein may be utilized to provide at least one common interest or accelerator from a pool of people to take samples from.

Figure 2:
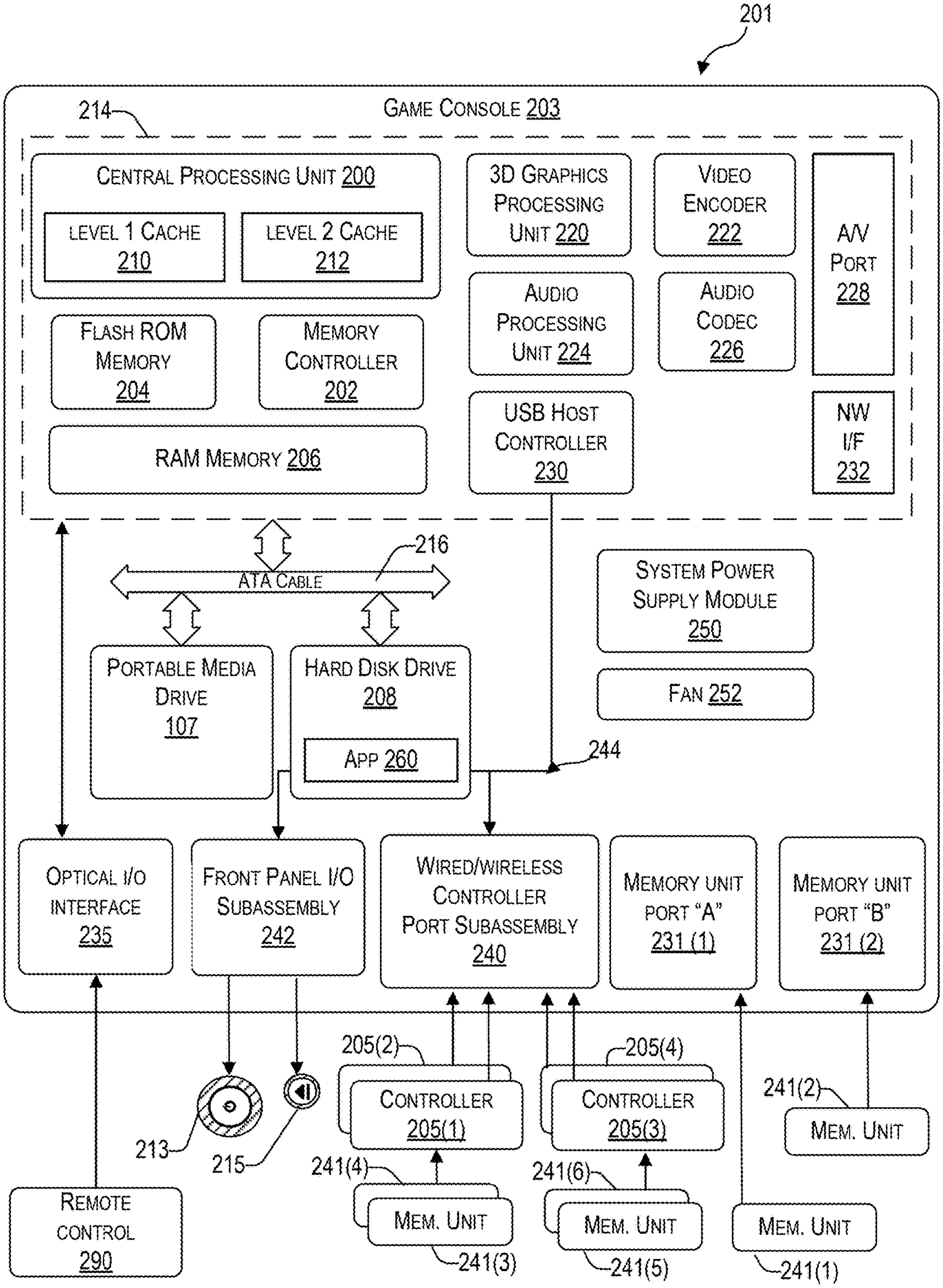
FIG. 2 is a block diagram of an exemplary gaming console.

FIG. 2 is a functional block diagram of gaming and media system 201 and shows functional components of the gaming and media system 201 in more detail. Console 203 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 107. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 107 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 205(1)-205(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 203 includes a controller support subassembly 240 for supporting four controllers 205(1)-205(4). The controller support subassembly 240 includes any hardware and software components needed to support wired and wireless operation with an external control device, such as for example, a media and game controller. A front panel I/O subassembly 242 supports the multiple functionalities of power button 213, the eject button 215, as well as any LEDs (light emitting diodes) or other indicators exposed on the outer surface of console 203. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 241(1) and 241(2) are illustrated as being connectable to MU ports "A" 231(1) and "B" 231(2) respectively. Additional MUs (e.g., MUs 241(3)-241(6)) are illustrated as being connectable to controllers 205(1) and 205(3), i.e., two MUs for each controller. Controllers 205(2) and 205(4) can also be configured to receive MUs (not shown). Each MU 241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 203 or a controller, MU 241 can be accessed by memory controller 202. A system power supply module 250 provides power to the components of gaming system 201. A fan 252 cools the circuitry within console 203.

An application 260 comprising machine instructions is stored on hard disk drive 208. When console 203 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 201 may be operated as a standalone system by simply connecting the system to monitor a television, a video projector, or other display device. In this standalone mode, gaming and media system 201 enables one or more players to play games, or enjoy digital media, e.g., by watching movies, or listening to music. However, with the integration of broadband connectivity made available through network interface 232, gaming and media system 201 may further be operated as a participant in a larger network gaming community, as discussed in connection with FIG. 8.

Figure 3:
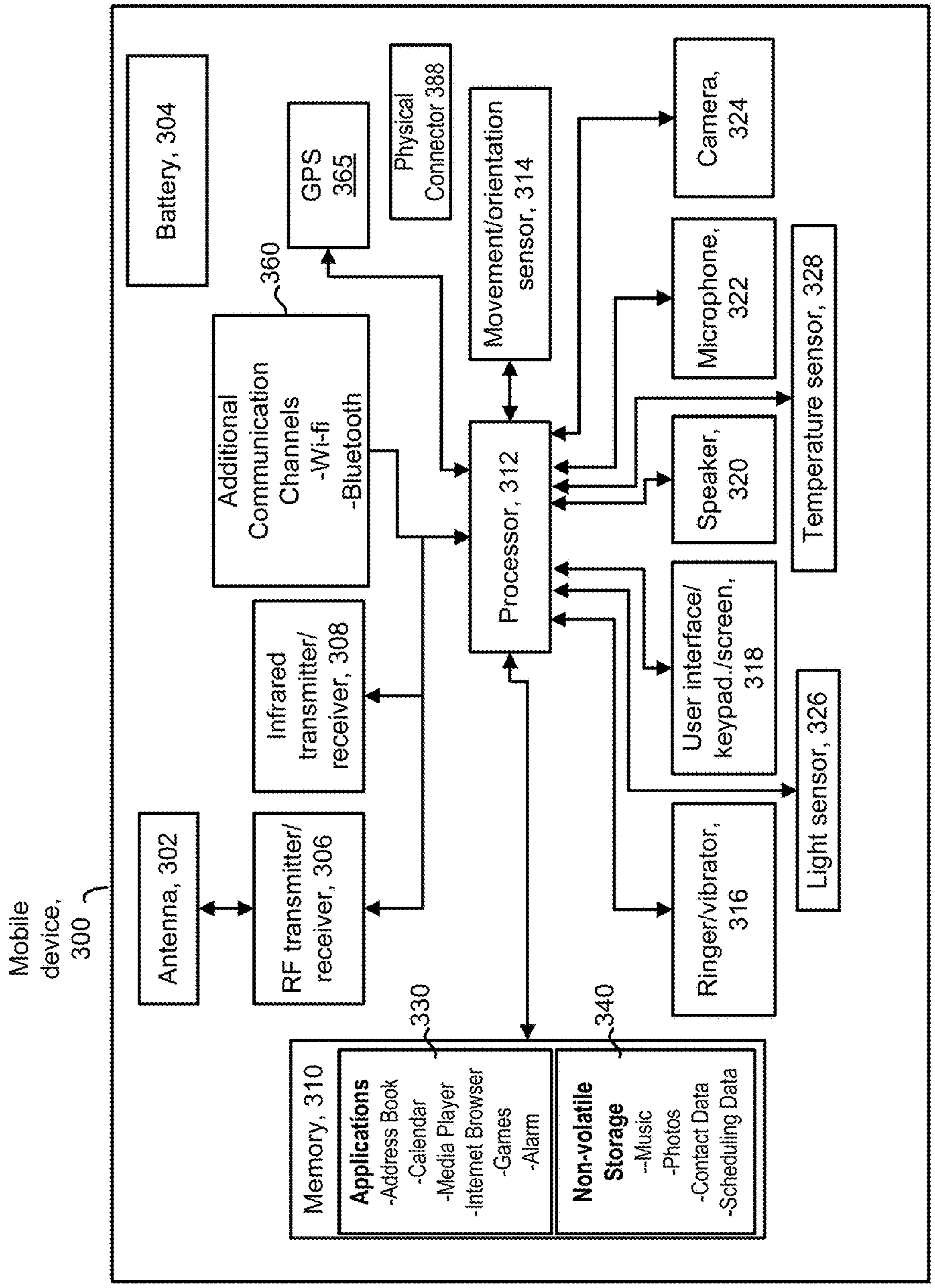
FIG. 3 is a block diagram of an exemplary mobile device.

FIG. 3 depicts an example block diagram of a mobile device. Exemplary electronic circuitry of a typical m phone is depicted. The phone 300 includes one or more microprocessors 312, and memory 310 (e.g., non-volatile memory such as ROM and volatile memory such as RAM) which stores processor-readable code which is executed by one or more processors of the control processor 312 to implement the functionality described herein.

Mobile device 300 may include, for example, processors 312, memory 310 including applications and non-volatile storage. The processor 312 can implement communications, as well any number of applications, including the interaction applications discussed herein. Memory 310 can be any variety of memory storage media types, including non-volatile and volatile memory. A device operating system handles the different operations of the mobile device 300 and may contain user interfaces for operations, such as placing and receiving phone calls, text messaging, checking voicemail, and the like. The applications 330 can be any assortment of programs, such as a camera application for photos and/or videos, an address book, a calendar application, a media player, an internet browser, games, an alarm application, other third party applications, the interaction application discussed herein, and the like. The non-volatile storage component 340 in memory 310 contains data such as web caches, music, photos, contact data, scheduling data, and other files.

The processor 312 also communicates with RF transmit/receive circuitry 306 which in turn is coupled to an antenna 302, with an infrared transmitted/receiver 308, and with a movement/orientation sensor 314 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 312 further communicates with a ringer/vibrator 316, a user interface keypad/screen 318, a speaker 320, a microphone 322, a camera 324, a light sensor 326 and a temperature sensor 328.

The processor 312 controls transmission and reception of wireless signals. During a transmission mode, the processor 312 provides a voice signal from microphone 322, or other data signal, to the transmit/receive circuitry 306. The transmit/receive circuitry 306 transmits the signal to a remote station (e.g., a fixed station, operator, other cellular phones, etc.) for communication through the antenna 302. The ringer/vibrator 316 is used to signal an incoming call, text message, calendar reminder, alarm clock reminder, or other notification to the user. During a receiving mode, the transmit/receive circuitry 306 receives a voice or other data signal from a remote station through the antenna 302. A received voice signal is provided to the speaker 320 while other received data signals are also processed appropriately.

Additionally, a physical connector 388 can be used to connect the mobile device 100 to an external power source, such as an AC adapter or powered docking station. The physical connector 388 can also be used as a data connection to a computing device. The data connection allows for operations such as synchronizing mobile device data with the computing data on another device.

A global positioning service (GPS) receiver 365 utilizing satellite-based radio navigation to relay the position of the user applications enabled for such service.

Figure 4:
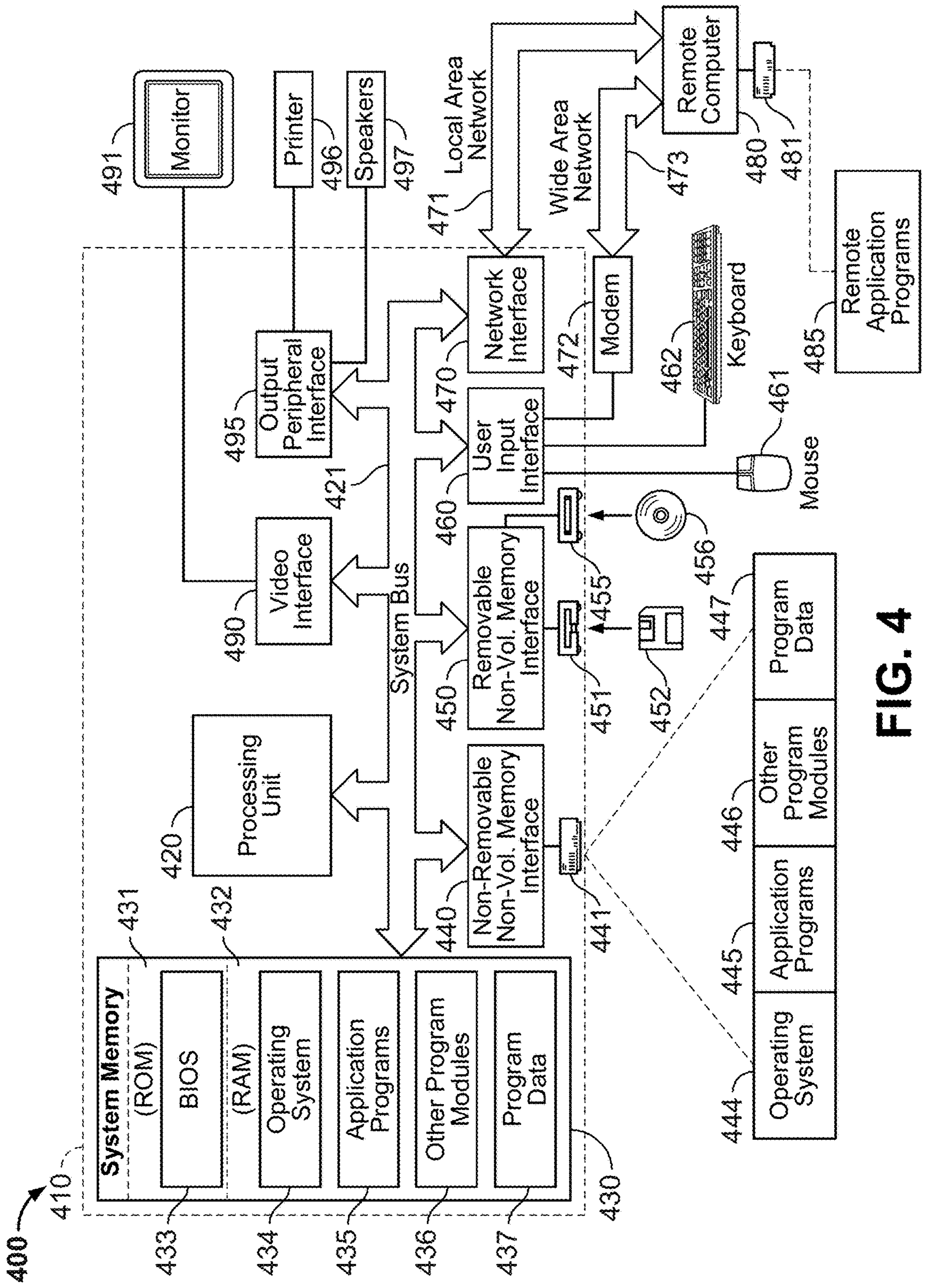
FIG. 4 is a block diagram of an exemplary processing device.

FIG. 4 illustrates an example of a suitable computing system environment 400 such as a personal computer. With reference to FIG. 4, an exemplary system for implementing the technology includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 440 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through an non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 20 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through a output peripheral interface 490.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

Figure 5A:
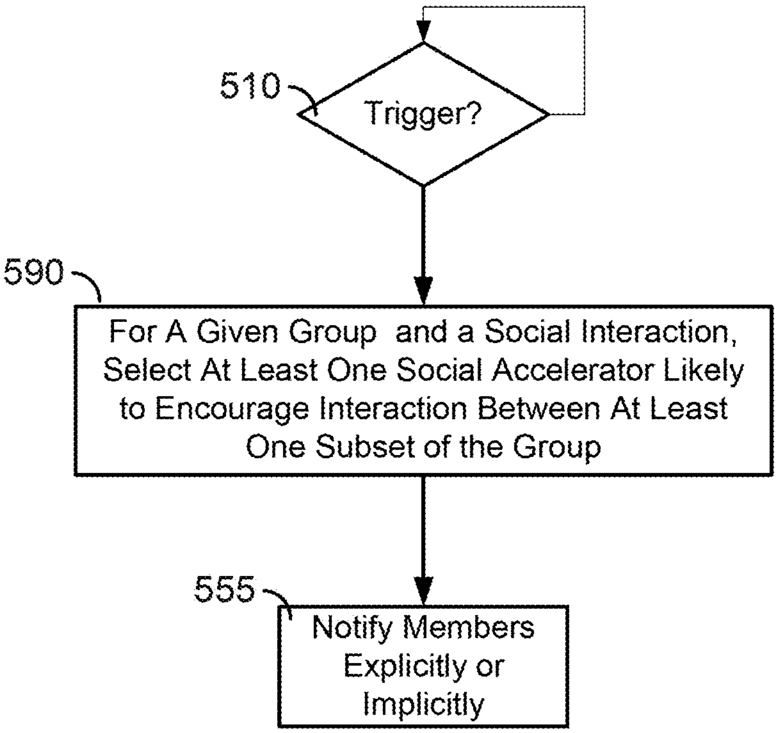
FIG. 5A is a flowchart illustrating a first method in accordance with the technology

FIG. 5A illustrates a general method in accordance with the present technology. Generally, at 510, a triggering event will occur. The triggering event may comprise any of a number of different actions initiating or occurring in a social interaction, including an initial meeting of individuals, a phone call between individuals, a short message service (SMS) or multimedia message service (MMS) text, instant message or email, a calendar event, periodic event, a phone call, a user request for additional information, user movement into a particular area, user proximity to other users who have opted into the technology, entrance into or initiation of a group gaming lobby, such as an Xbox Live® game lobby, use of a group chat service, such as Xbox Live® chat, and the like. The triggering event can be any event which causes an individual or an application to initiate a request for a social accelerator. At 590, for a given group in a social interaction, at least one social accelerator which may encourage interaction between at least a subset of the members of the group is selected. At 555, the accelerator is provided users either explicitly or implicitly via a processing device associated with users in the subset. Explicit examples are notifying the user via one or more direct means that other people are present with a common interest. Implicit notification can include, for example, notifying a group of breaking news about a common interest or playing music by a performer which all users share an interest in.

Figure 5B:
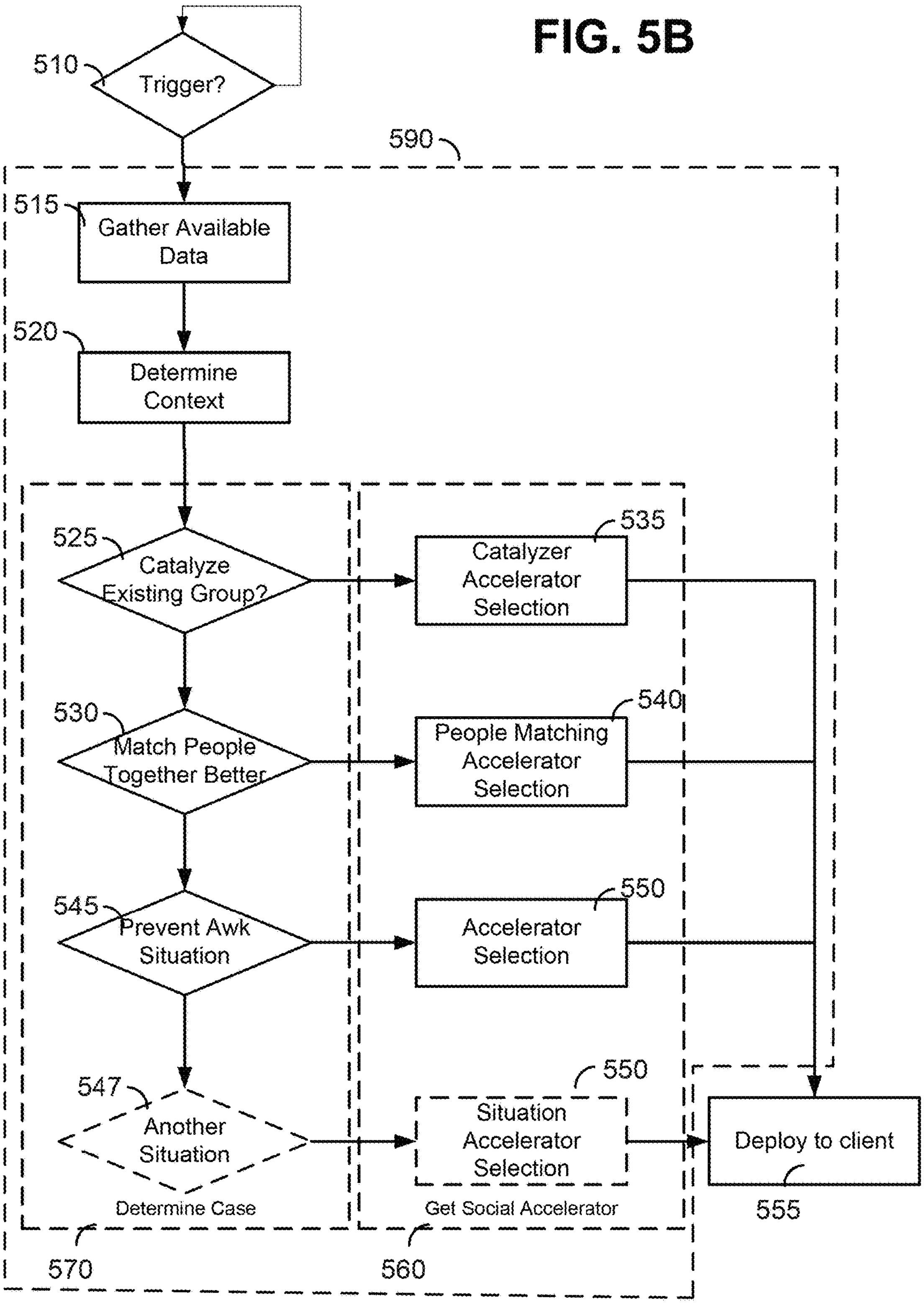
FIG. 5B is a flowchart illustrating a more detailed process flow of a first method in accordance with the technology.

FIG. 5B illustrates one embodiment of the method illustrated in FIG. 5A to provide social acceleration to social interactions. Following a trigger event at 510, at 515, available data on any of the individuals in the social interaction is gathered. As illustrated in FIG. 1, the data may comprise public data and private data. Public data may include things such as items which an individual posts to public web sites or publically available information locations. Types of information which may be gathered at 515 include, without limitation: data such as information from social web sites such as Facebook®, Foursquare™, and My Space™; information available from any aforementioned public data sites; service data, such as that which may be available from gaming services such as Xbox LIVE®, including gamer profile data; user real time search and search history; user data such as user contacts, contact history, messaging history and contact interactions; geo-location presence; geo-location history; purchasing data indicating items the user has recently bought; application data indicating the types of applications a user has recently used; personal interest data culled from the aforementioned public web sites published by the user; social graphing data, including friends, friends of friends, family and other socially defined relationships; data related to an activity a group is participating in (e.g. playing Halo®) or provided by the application the collective group is using and exposed data from friends of the user and other levels of the social graph.

It should be understood that in certain context, the data gathered at 515 may be limited. That is, it is desirable in social interactions to provide a social accelerator within a particular time period. Hence, the amount of available data at 515 may be filtered to a smaller set in order to provide more relevant information back to an individual within an acceptable time period in order to render the social accelerator relevant. Taking too long to provide a social accelerator would defeat the effectiveness of the social acceleration use.

At 520, the context of the interaction is determined. Context can be defined as the situation relevant details of the social interaction. Such details can include: the type of social interaction, whether virtual or personal; the type of event, whether predefined or random; and the speed of the social interaction accelerator required—immediate to avoid a socially awkward situation, or temporally distant, where a user has time before the interaction is to occur. The context can define the types of data that an acceleration selector 535, 540, 550, described below, will use to make an accelerator selection and how quickly the selector will return this data to the user or group. In alternative embodiments, no context is determined. In this context, data which may be relevant in one context or case may not be relevant in others, and vice-versa. Once the available data is gathered and the context determined, a determination is made on which conversation acceleration case is required at 570. If the case is to catalyze an existing group of users at 525, then a catalyzer acceleration selection metric is used at 535. A catalyzer selection metric is described below in FIG. 12. If a people matching case is determined at 530, then a people matching accelerator selection metric is used at 540. If an awkward situation prevention case is determined at 545, an awkward case accelerator selection metric is utilized at 550. Any number of different situational cases 547 and situational accelerator selection types 552 can be utilized in the present technology. For example, an additional case 547 may be to catalyze a new group to create or join an event. In addition, specific cases such as those illustrated in FIG. 9 may be provided. Specific cases include situations where an on-line game match is desired or a participating user is present in an on-line game lobby waiting for other users to join a game or seeking to play a game with user with whom the participating user might like to socialize. The determination of a case is described below with respect to FIG. 10. Respective selectors are described below with respect to FIGS. 10, 11 and 12.

Figure 6A:
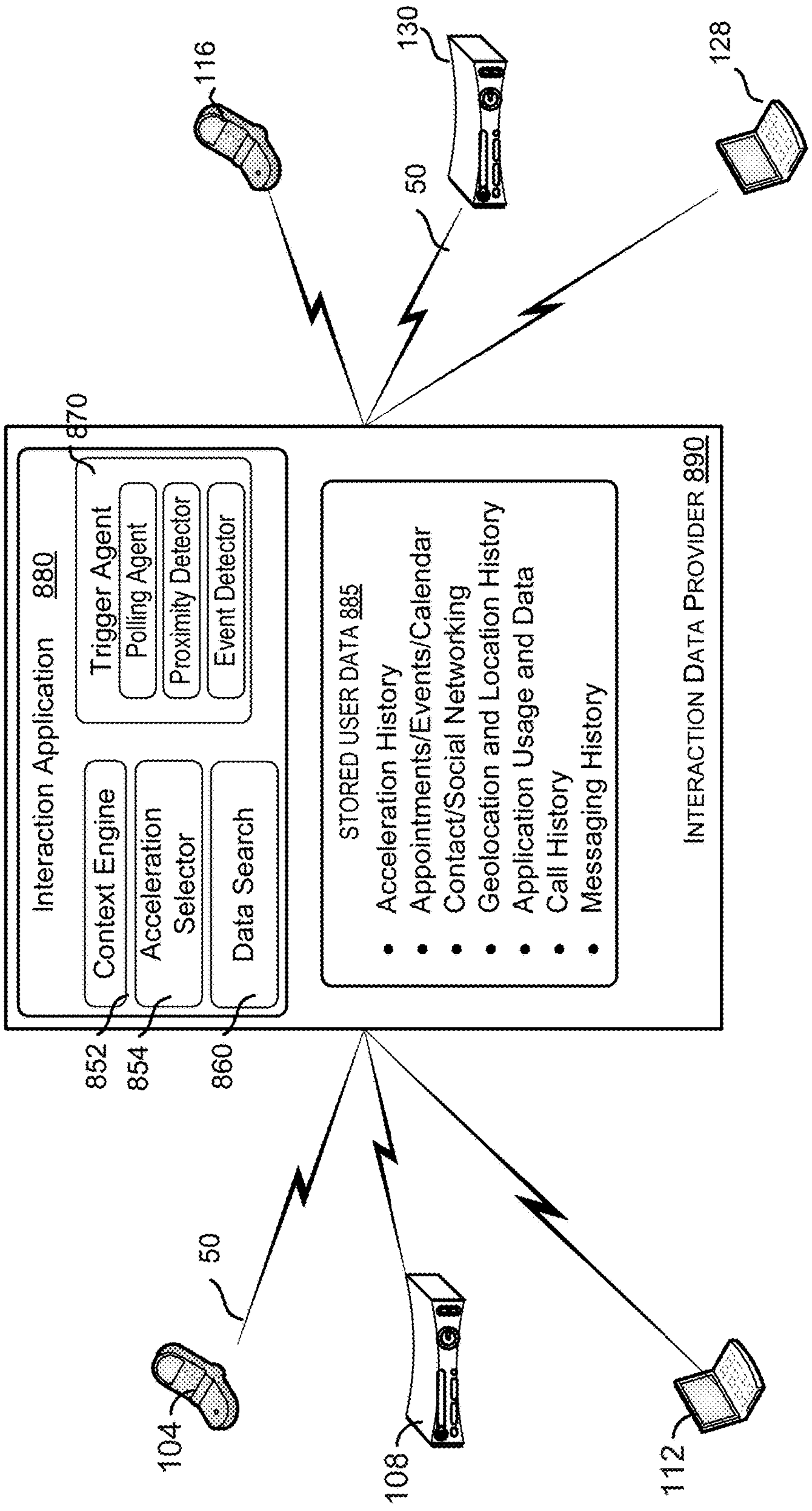
FIG. 6A is a block diagram illustrating the technology implemented on a centralized processing device.
Figure 6B:
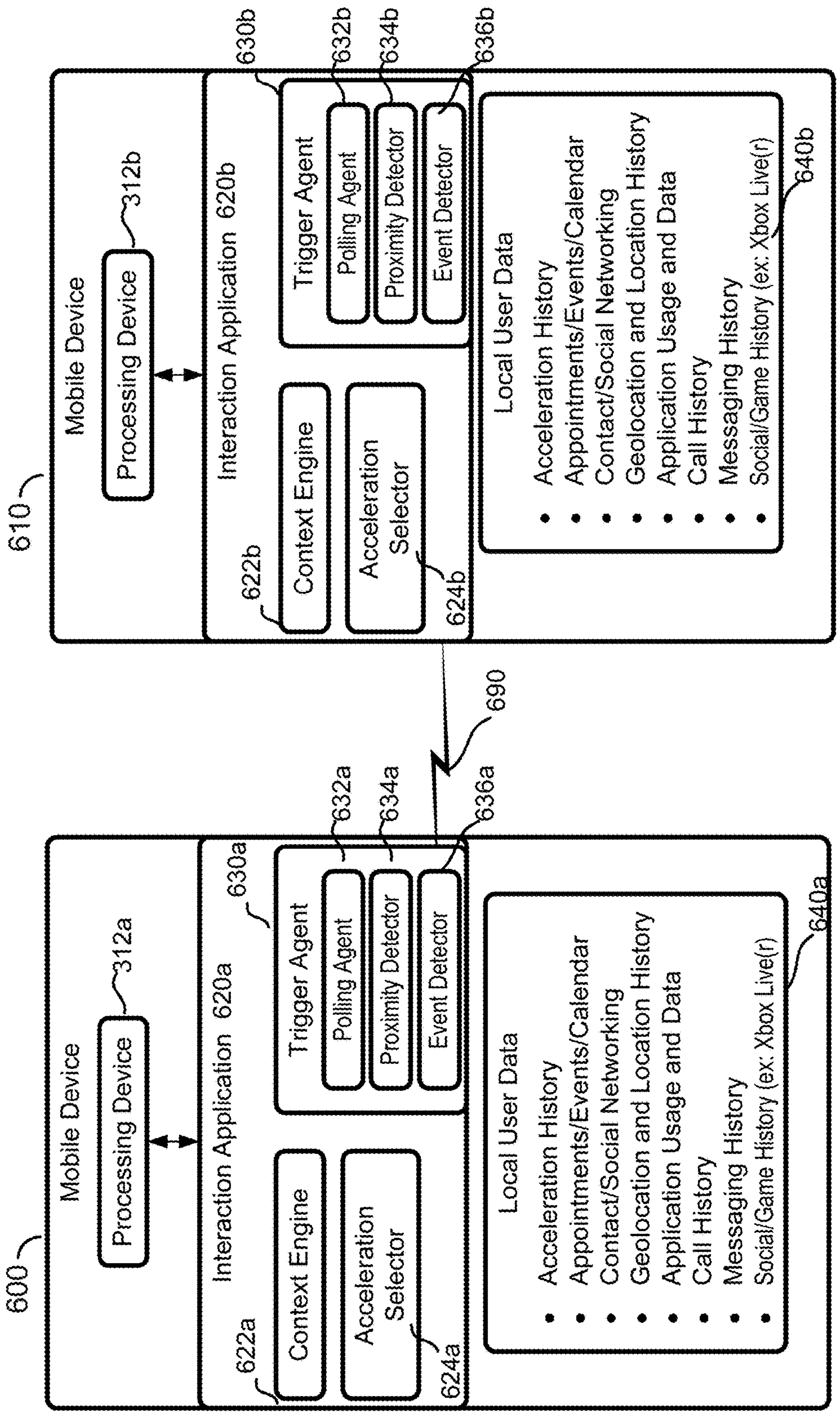
FIG. 6B is a block diagram illustrating the technology implemented on two communicating mobile devices.

FIGS. 6A, and 6B illustrate general examples of an implementation of the technology for providing social accelerators in accordance with the description herein. FIG. 6A illustrates a server based implementation of the technology which may notify client devices using, for example, conventional messaging technology provided in the client devices. FIG. 6B illustrates a peer-to-peer communication embodiment utilizing a dedicated interaction application provided on respective mobile devices. FIG. 6A illustrates an implementation where one or more individual user devices need not have a dedicated application on an associated processing device, while FIG. 6B illustrates that it is not necessary that a centralized control processing device be provided. It should be understood that the peer-to-peer example shown in FIG. 6B may occur between various types of processing devices other than mobile devices (for example, a mobile device and a gaming console, a gaming console and a computer, and the like), and more than two processing devices. The implementation of FIG. 6B may be used alone or in conjunction with the implementation examples shown in FIGS. 6A and 8 wherein an interaction application data provider is utilized to control and augment social accelerator interactions between a plurality of users.

Illustrated in FIG. 6A is a centralized interaction data provider 890 operates one or more processing devices or servers, any one or more of which can provide instances of interaction application 810 as a service to devices via network 50. Interaction application 810 provides client devices 104, 108, 112, 116, 128, 130 with social accelerators via one or more communication technologies available on the client device without the need for a specialized application on the client device. Application 880 includes a triggering agent 870 which detects triggering events and operates in a manner similar to a client based trigger agent 630 described below with respect to FIG. 6B. Devices connecting to application 810 may be required to authenticate themselves or their associated user via a user authentication service (not shown). In an alternative embodiment, no authentication mechanism is needed—any association between a processing device and a user to whom the social accelerator is directed is sufficient to enable the technology. Interaction application 880 also includes a context engine 822 and acceleration selector 824 which operate in a manner similar to those described below with respect to interaction application 620A and 620B and further detailed in FIGS. 9 through 15. Interaction application 880 also includes a data search engine 860 can connect to public and private information available in cloud information 170 and private data 190. Interaction application 880 can access both the stored user data 885, as well as cloud data 170 and private data 190. Stored user data can include accelerator history, comprising of recent accelerators associated with the client processing device or with the user of a processing device, calendar information associated with a user or with the processing device which may include appointments, events, and other calendar data, contact and social networking information, geo-location presence data and location history data, application usage information and application specific data, call history, and messaging history for the individual user or device.

FIG. 6B illustrates a peer to peer embodiment enabling the present technology including a first mobile device 600 and a second mobile device 610. It should be noted that any two processing devices of any type disclosed herein may comprise devices 600 and 610, and mobile devices are illustrated herein merely for convenience. Each mobile device includes a processing device 312A, 312B, and an interaction application 620A, 620B, and local user data 640A, 640B. Mobile device 600, 610 may be the mobile device as that described above with respect to FIG. 2. Each device will contain the user data for the associated user of the mobile device. Local user data can include, but not be limited to, accelerator history, comprising of recent accelerators associated with the user of the mobile device and/or between the user of mobile device 600 and mobile device 610, calendar information which may include appointments, events, and other calendar data, contact and social networking information, geo-location presence data and location history data, application usage information and application specific data, call history, and messaging history for the individual user of device 600, 610. An interaction application 620A, 620B provided on respective devices can include, for example, a context engine 622A which determines the particular case and context of an accelerator which may be relevant to a particular situation, an acceleration selector which processes the local user data and any known data of a second user to determine an accelerator to return to the user of the device, and a triggering agent 530A which may include, for example, a polling agent which periodically returns social accelerators to the user on a timed basis, a proximity detector 634A, 634B which detects the presence of other users having interaction applications installed on one or more devices and can trigger the acceleration process described above with respect to FIG. 5 upon detection of a user and proximity of device 600 or when the user is connected to another user having an interaction application, in an event detector 636A, 636B, which detects events in a user's calendar or other information which can generate a trigger to begin the accelerator process to return information to the user which will be relevant to the user at the event.

In the context of FIG. 6B, a direct connection 690 can be made between each of the respective mobile devices 600 and 610. Each interaction application can detect the presence of the other application on a mobile device of another participating user. Any number of mechanisms may enable such detection, including, for example, continuously polling a known network port on which each interaction application listens for other applications and establishing a connection when detected. When an event trigger is detected by the trigger agent 630*a*, 630*b* the interaction application uses the acceleration selector 624*a*, 624*b* and context engine 622*a*, 622*b* to provide an accelerator to the user of the device (e.g. device 610) which may be an interaction accelerator for the user of the other device (e.g. device 610).

Various examples of the type of notifications which can be provided to the user are illustrated in FIGS. 7A-7F. Although FIGS. 7A-7F illustrate exemplary interfaces for a mobile device, it should be understood that the concepts for providing accelerators illustrated in FIGS. 7A-7F are not limited to mobile devices and may be provided via a user interface from any type of processing device.

Figure 7A:
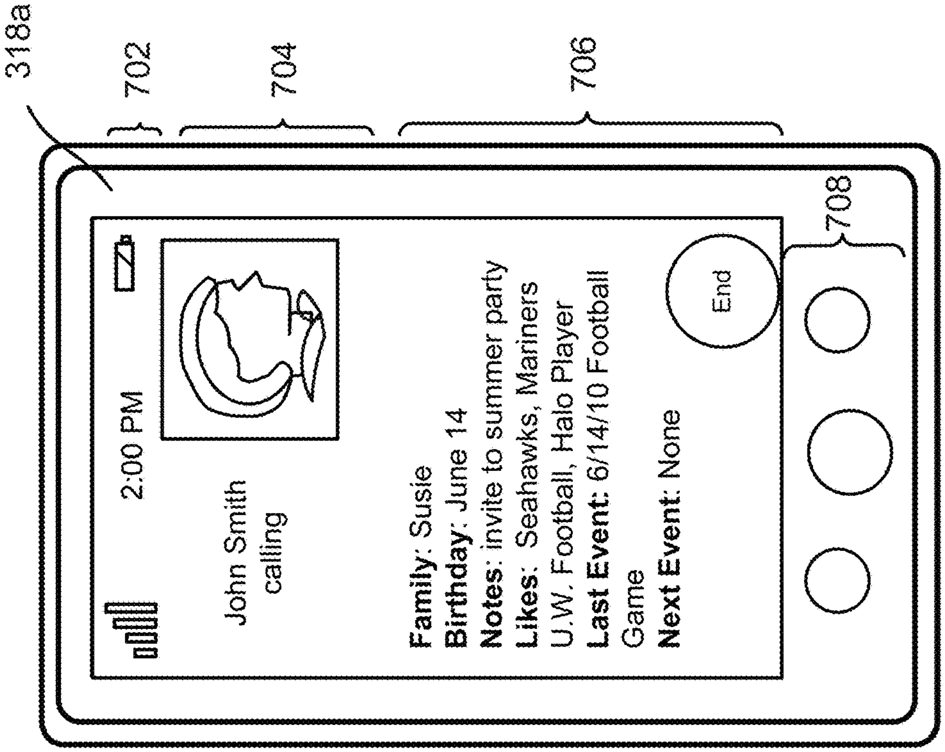
FIGS. 7A-7F illustrate various user interfaces presenting social accelerators on a mobile device.

FIG. 7A shows a user interface 318*a* of a mobile device illustrating an example where a user on a mobile device such as that illustrated in FIG. 6 receives a phone call from another individual. The phone call itself can act as a triggering event. In FIG. 7A, the phone interface 318*a* includes a status area 702 illustrating the signal strength, time, and battery power available, and one or more physical control buttons in area 708. Area 704 illustrates the name and photo of the calling party. In this case, John Smith is calling for the phone's user. FIG. 706 illustrates a first set of social accelerators which are available to the called party. A phone call is an event where one may wish to avoid a socially awkward situation. As such, the social accelerators selected to help the called party remember information about the calling party which, if forgotten, might embarrass the called party. In this example, the information tells the called party that the calling party's family information includes a wife, Suzy, the user's birthday, selective notes, selective likes, the last event that the two users attended together, and the next event that the two users have planned. In this case, notes may indicate information that the phone's user has provided to himself about the other user. The information on the calling party's "likes" may be provided from information local to the device e.g. from historical data stored in the phone, or may be derived from information about the calling party which is available from the cloud information 170. Local information may include matching items such as attendance at common events or meetings together in the past. For instance, user John Smith and the mobile device user may have attended Seahawks and Mariners' sporting events together, and the number of events that the two users have attended together may indicate that the calling party, John Smith, enjoys football. Public information in a gaming profile for John Smith may indicate that John enjoys playing Halo. The information provided at 706 can allow the called party to avoid awkward situations and provide the called party with topics to discuss during the phone call with John Smith.

Figure 7B:
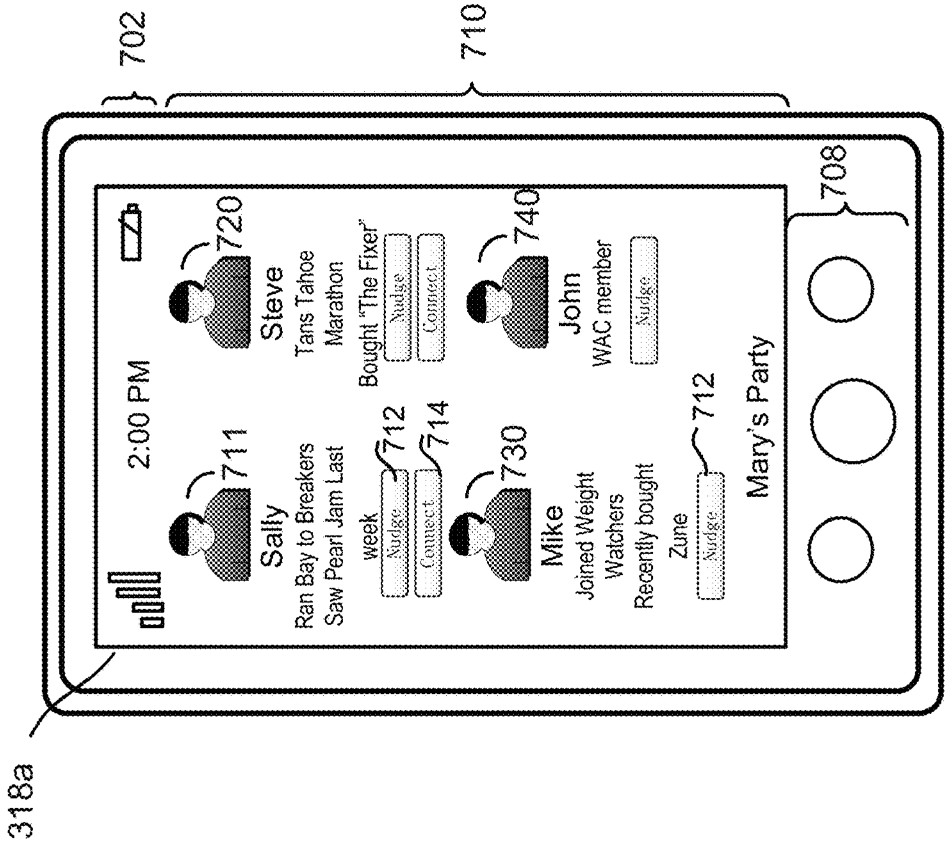

FIG. 7B illustrates seven notifications that may be provided during a people matching case. In FIG. 7B, a user viewing interface 918 is present at a social event, referred to on the interface as "Mary's Party." An information area 710 in a people matching situation may present a number of different users 711, 720, 730, 740, and information relative to the individual user that may be in common with the user of the phone device. In FIG. 7B, the user of the device is, for example, an athlete who enjoys running and music. As such, accelerators can be returned to the user of the device for each user in the proximity detected by the interaction application may be relevant to the device user's interests. For user 711, "Sally", information that Sally ran—the Bay to Breakers foot race and saw Pearl Jam last week is presented. User "Steve" 720 recently ran the Trans Tahoe Marathon and recently bought the album "The Fixer", while user "Mike" 730 recently joined Weight Watchers and recently bought a Zune music device. The fact that Mike joined Weight Watchers may be indicative of the fact that Mike has some interest in becoming more fit, and thus would enjoy discussing athletics with the user of the phone and Sally or Steve. User "John" 740 is a Washington Athletic Club member, and thus is likely to also be interested in athletics. In interface 7B the people matching social accelerators center on a music theme and an athletics theme. Any of these accelerators may generate an interest in the user of the phone. For example, the user of the phone may wish to join the Washington Athletic Club and/or may be interested in running the Trans Tahoe Marathon. Other interests, themes and events could be social accelerators.

Connection options may be provided to connect to each of the various users presented in the interface 318. A "nudge" button 712 and a "connect" button 714 can allow the interactive application to present an interface on the other user's interaction application. A "nudge" selection by the user of interface 318*a* may present a notification to, for example, "Sally" then another user in the room is interested in the accelerator items listed in FIG. 7A-7B. A nudge may comprise an attempt to connect without identifying the sending user, while a connect may be a more direct request for a connection. It will be appreciated that the "nudge" and "connect" examples set forth herein are merely illustrative of accelerator uses which may be provided by a processing device.

Figure 7D:
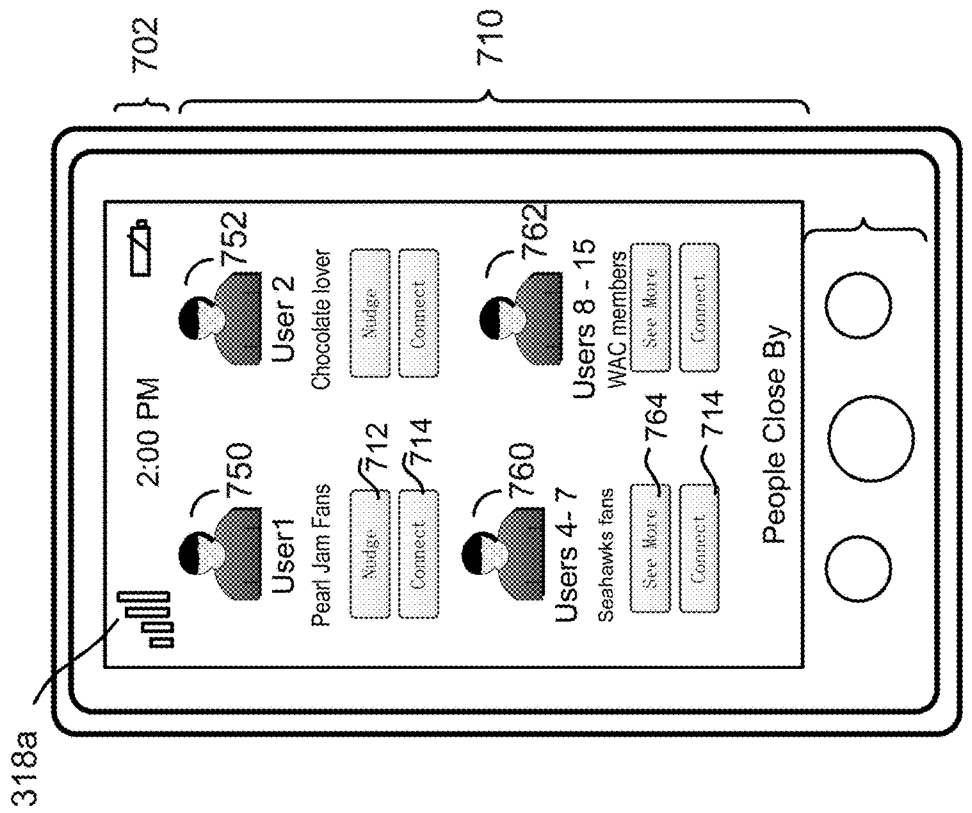
Figure 7C:
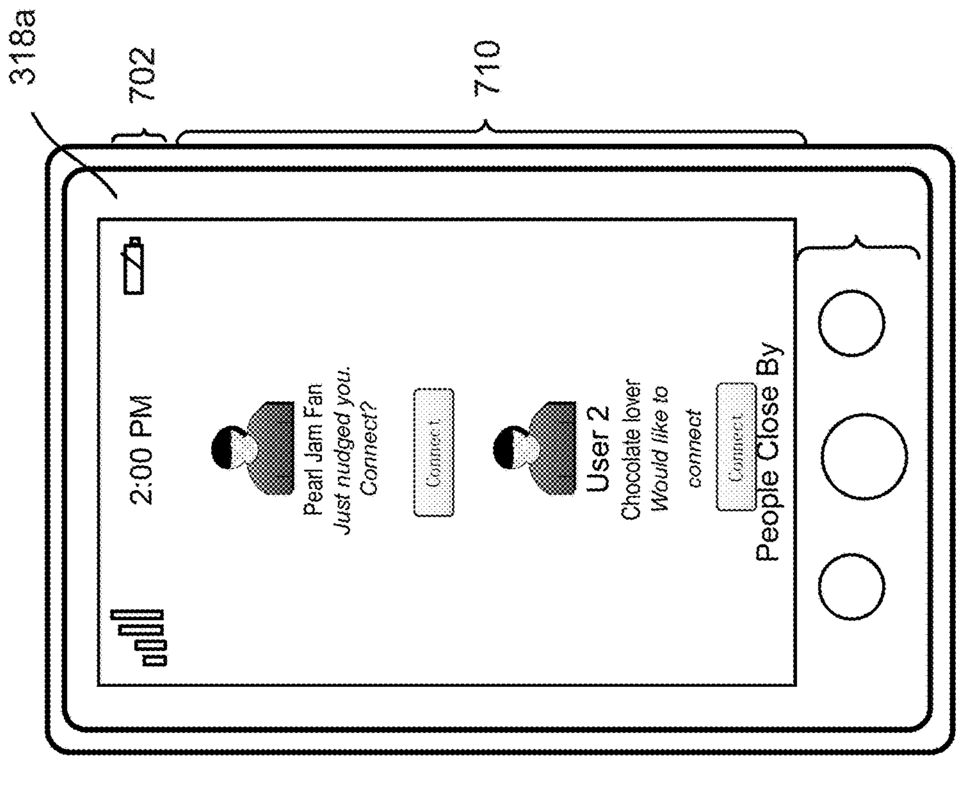

An example of receiving a "nudge" or "connect" request is illustrated in FIG. 7C. As shown therein, a nudge indicates that another user is "interested" in the Bay to Breakers. Selecting a connection item 714 may result in a more direct connection request, also interested in FIG. 7C, indicating, for example, that another user in the room wishes to discuss Pearl Jam and offering Sally an opportunity to connect with that user. If Sally accepts the connection, the user's contact information may be provided via the interaction application by sharing personal information such as a photo and name information. In other cases, a social accelerator may be presented for users to engage with or not, based on their own choosing.

FIG. 7D illustrates another alternative wherein the technology is utilized to catalyze an existing group of users. In FIG. 7D, an interface 318 is presented whereby users are classified into different groups. The groups may be as small as one user, or any number of users. User 1 (750) is displayed and shares an interest with the phone's user of being a Pearl Jam fan. Likewise, user 2 (752) has indicated via his public or private information that he is a chocolate lover. Users 4 through 7 (760) have all indicated that they are Seattle Seahawks fans, and users 8 through 15 (762) have all indicated that they are Washington Athletic Club members. For users 750 and 752, the opportunity to nudge or connect to the members is presented. For larger groups of users, the interface may present a "see more" selection 764, which may provide a more detailed representation of all the users who are Seahawks fans or WAC members. A connect selection 714 may operate in a manner similar to that disclosed above offering to connect both the use of the interface 718 as well as other users who share the same interest in the room. It should be understood that the notifications provided in FIGS. 7A-7D may be utilized in both the peer-to-peer embodiment shown in FIG. 6 and the networked embodiment shown in FIG. 8, and discussed below.

Figure 7E:
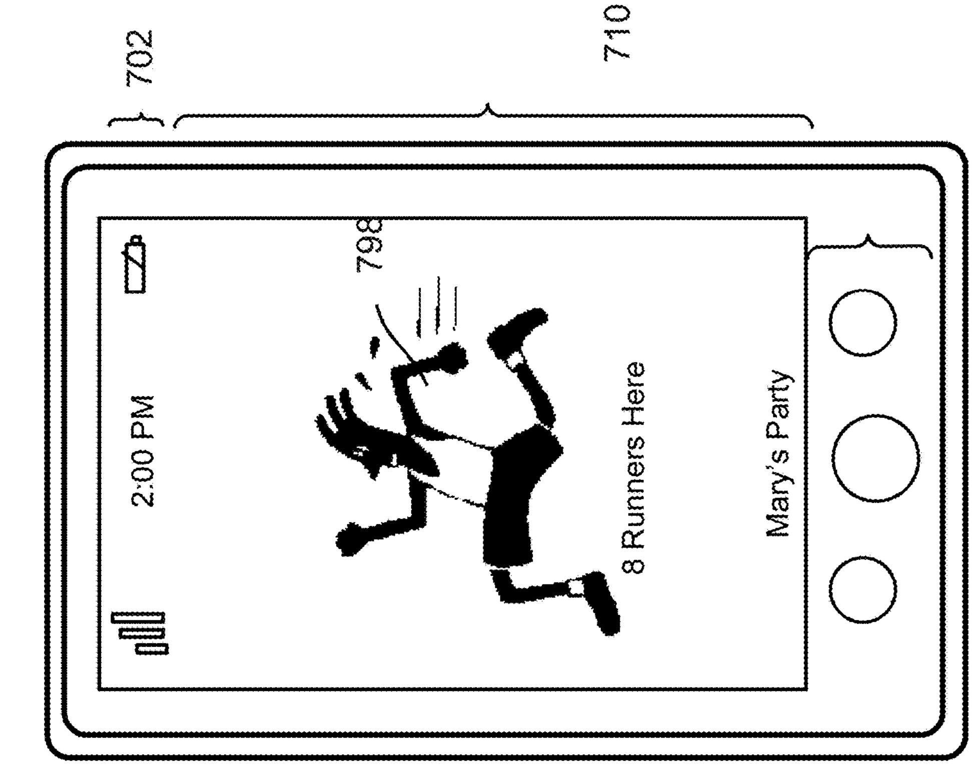
Figure 7F:
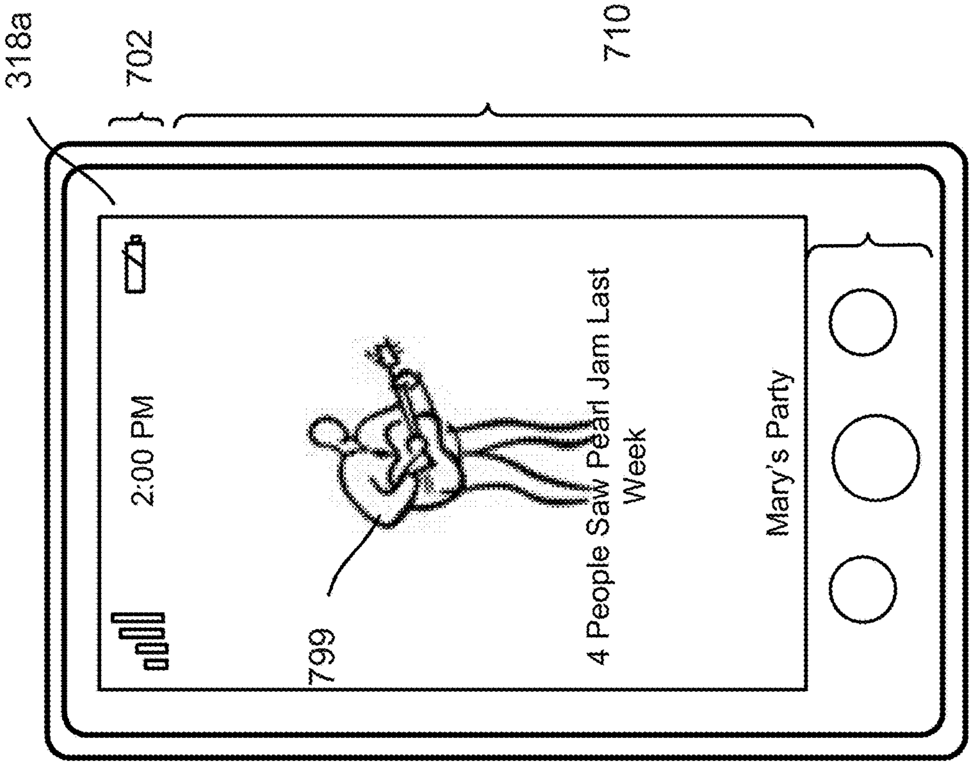

FIGS. 7E and 7F illustrate alternative user interfaces providing a social accelerator. FIG. 7E illustrates an alternative to providing a social accelerator in the social interaction of "Mary's Party" discussed above with respect to FIG. 7B. In FIG. 7B, on common interest which may serve as a social accelerator is an interest in fitness, specifically running, while another was an interest in music and specifically the band Pearl Jam. In FIG. 7E, a social accelerator for running is presented as an icon 798 and an accelerator for music in FIG. 7F as an icon 799. Explanatory text may further indicate the meaning of the icon, and users of the device may then have the option of selecting the icon to see additional information. In one embodiment, where the user does not select the icon for further information, another accelerator may be presented. Accelerators may rotate or move to one or more additional accelerators determined by the technology based on the event and proximity of users to the event.

Figure 8:
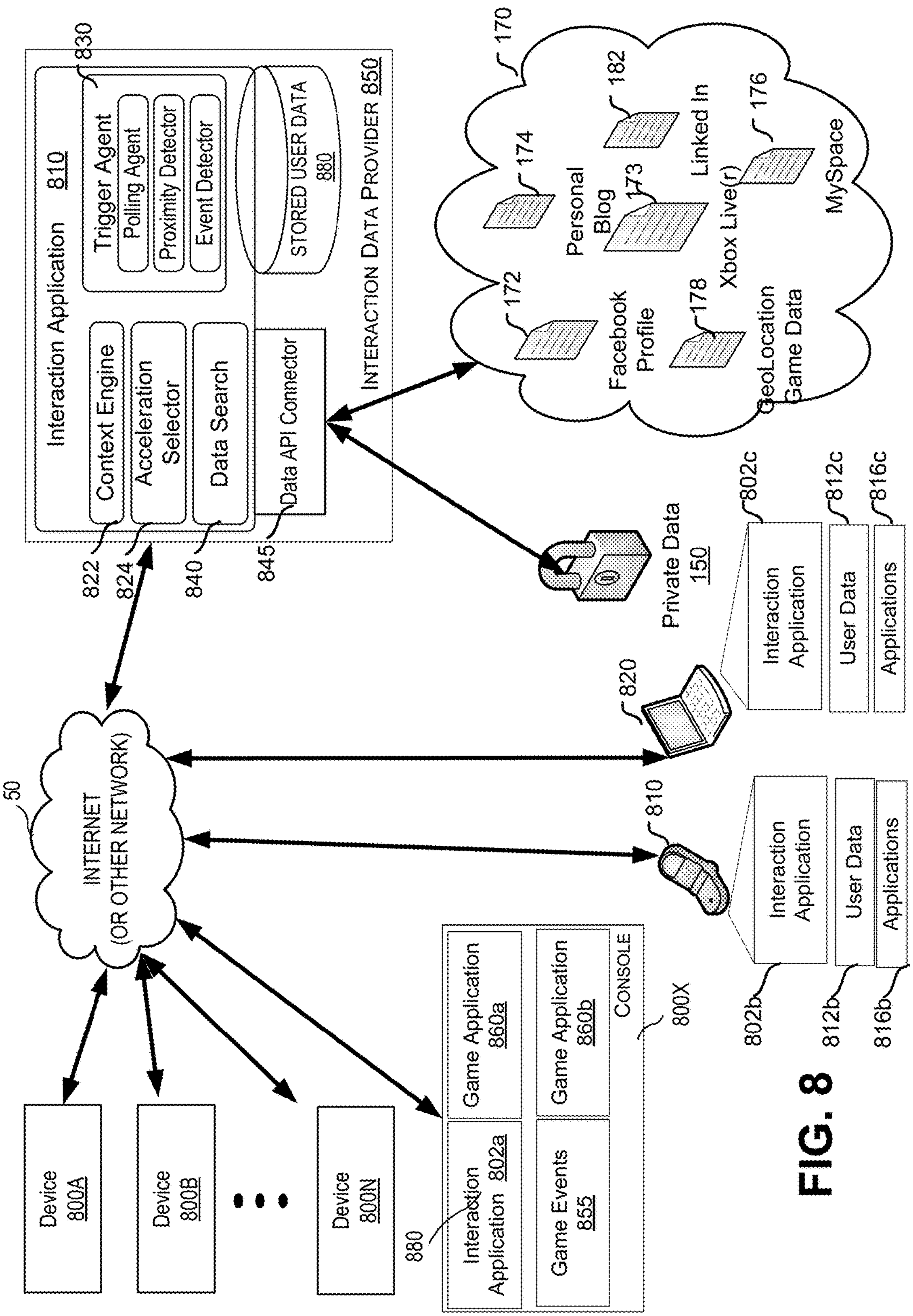
FIG. 8 depicts a server based system for implementing the technology discussed herein.

FIG. 8 illustrates a networked interaction application 810 which can be utilized with any number of devices such as device 800A, 800B, 800N and 800X, which may comprise any of the devices illustrated above with respect to FIGS. 1-4, or any type of processing device capable of connecting to a network 50 and which may be associated with a user or individual. As illustrated in FIG. 8, each device includes a respective interaction application 802A, 802B, 802C, user data 812A, 812B, 812C, and one or more applications 816A, 816B, 816C. An interaction data provider 850 operates one or more processing devices or servers any one or more of which can provide instances of interaction application 810 as a service to devices via network 50. Each of the interaction applications 802A, 802B, 802C may be written for the particular type of device utilized, and the types of data which are likely to be provided on a device and the types of context in which the device is likely to be utilized. For example, an interaction application 802A utilized on a console 800 may be tailored to use data regarding game events 855, and gain applications 860A and 860B.

Interaction application 810 operates in a manner similar to interaction applications operating on specific client devices, but includes additional service level capabilities. Application 810 includes a triggering agent similar to that described above with respect to FIG. 6A, 6B. Devices connecting to application 810 may be required to authenticate themselves or their associated user via a user authentication service (not shown). In other embodiments, authentication is not required. The triggering agent 830 detects trigger events including specific requests for information from requesting users and events detected by searching information store 880 of stored user data. In alternative embodiments, the triggering agent generates a trigger event based on the physical proximity of users or common presence in a game environment. Interaction application 810 also includes a context engine 822 and acceleration selector 824 which operate in a manner similar to those described above with respect to interaction application 620A and 620B in further detail below and FIGS. 9 through 15. Interaction application 810 also includes a data search engine 840 which utilizes a data API connector 845 to connect to public and private information available in cloud information 170 and private data 190. Each of the respective data sources utilized in the cloud-based information 170 may include an API allowing third parties to access data stored in the particular environment. Interaction application 810 can access both the stored user data 880, as well as cloud data 170 and private data 190.

Users wishing to be participating users may be required to opt into the use of social accelerators, associate a processing device with themselves, and provide access to certain types of data. Users may be offered an opportunity to control the types of data which an interaction application can access, and limit that to selected types of information based on the user's preferences. As discussed below, the interaction application's relative access to different amounts of data can depend on whether the interaction application utilizes local data on a device, or stored user data 880, or cloud data 170. As noted above, whether the interaction application utilizes all such data may depend upon the amount of time that an interaction application has to return a social accelerator to a user in a relevant time period.

As discussed below, one aspect of interaction application 810 is that for all participating users, a subset of the user information may be stored on user data store 880. Interactive application 810 may continually search the user data store 880, as well as cloud data 170, and generate trigger events when possible accelerators are recognized in the searched data. In addition, the interaction application 810 may act as an agent for device based interaction applications and return additional social accelerators when trigger events occur on device-based applications.

Figure 9:
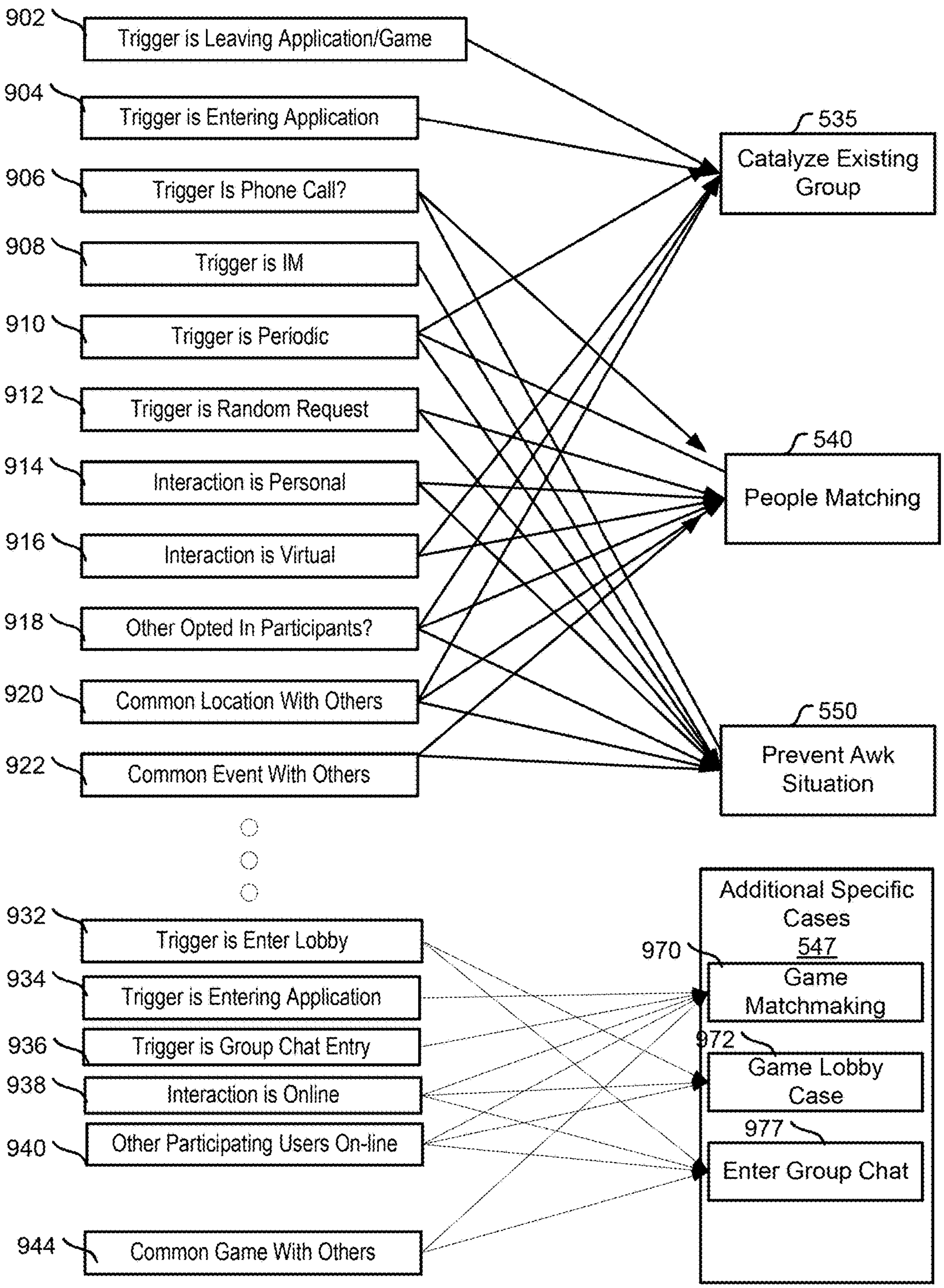
FIG. 9 illustrates weighing of context elements used to determine a case selection scenario for determining a social accelerator.

FIG. 9 illustrates a mechanism for determining the social accelerator case at step 570, illustrated above. The social accelerator case is dependent upon a number of factors which can be incorporated into the determination by weighting each factor with a decision weight, and summing each of the weighting factors to determine which case is to use for a given social interaction.

FIG. 9 is a non-exhaustive list illustrating factors 902 through 922 used in determining whether to use a group catalization case 535, a people matching case 540, or an awkward situation prevention case 550 in a particular event. The factors which can contribute to case determination include: whether a user is leaving an application or a game 902; whether the user is entering an application or game 904; whether the user is receiving a phone call 906; whether the user is receiving an instant message, message, e-mail, or other type of notification 908; whether the trigger is a periodic scan of a user's personal information; whether the trigger is a random request by the user without reference to a predefined event or situation 912; whether the interaction is personal 914; whether the interaction is virtual 916; whether other opted in participants of the interaction applications are detected 918; whether presence of other opted in participants are detected at a common location with the user 920; whether the users are at a common event 922; and other factors. The factors indicating that the case is one attempting to catalyze an existing group of users may be those including: whether a user leaving an application or game 902; a user triggering or entering an application or game 904; a periodic trigger 910; a personal interaction event 914; a virtual interaction event 916, the presence of other participating users 918, and the user at a common location with others at 920. The people matching context may include such indicators as: users receiving a phone call 906, the trigger is a random request 912, the interaction is personal 914, the interaction is virtual 916, other participants are at the event 918, the user is at a common location with other participants 920, or the user is at a common event with others 922. Indicators pointing to a case of avoiding an awkward situation include the users receiving a phone call 906, the users receiving an instant message or other messaging at 908, the trigger is periodic at 916, the periodic is random at 912, the interaction is personal 914, or virtual, 916, other opted in participants are available 918, or at a common location with the user 920, or there is a common event at which all users are attending 922. Different weights may be assigned to each of the respective factors 902 through 922, in some situates calculated at 535, 540, and 550 to determine a particular case in which accelerator selection routine should be utilized. The list and the factors contributing to each case is not exhaustive. Different definitions and factors can be used to define each case. Each factor may have the same weight or different weights Additional cases 547 are presented for purposes of illustration as interactions occurring over an online connection such as matching individuals for gaming or social interaction 547*a*, online presence in a game lobby waiting for or exiting a group gaming context 547*b*, and entering a group chat 547*c*.

Additional cases 547 are illustrated as online social or game matchmaking, presence in a game lobby, such as that provided by one or more online gaming services such as Xbox Live®, or a group chat room. Factors contributing to a determination that the context a game matchmaking case include entrance into a game lobby 932, entrance into a game application 934 (which may or may not be combined with entrance into a game lobby), an indication that the interaction is online 938, the fact that there are other participating users in the lobby or application 940, a common presence with other 942 and all users are in the same game 944. In the above case, certain factors such as the entrance into a game lobby and the presence of participating users may be allocated greater weight than other factors for the matchmaking case. Once the matchmaking case is determined, interests of members of the lobby or users running the application can be used to provide social accelerators in a variety of ways.

Other additional cases, such as presence in a game lobby 974 or entrance into a group chat environment 977, would be defined by other factors. For example, entrance into a group chat 936 would be a primary factor and heavily weighted in determining a chat specific case 977. Likewise, entrance into a game lobby 932 and presence of participating users 940 would be primary factors in determining a game lobby case.

Figure 10:
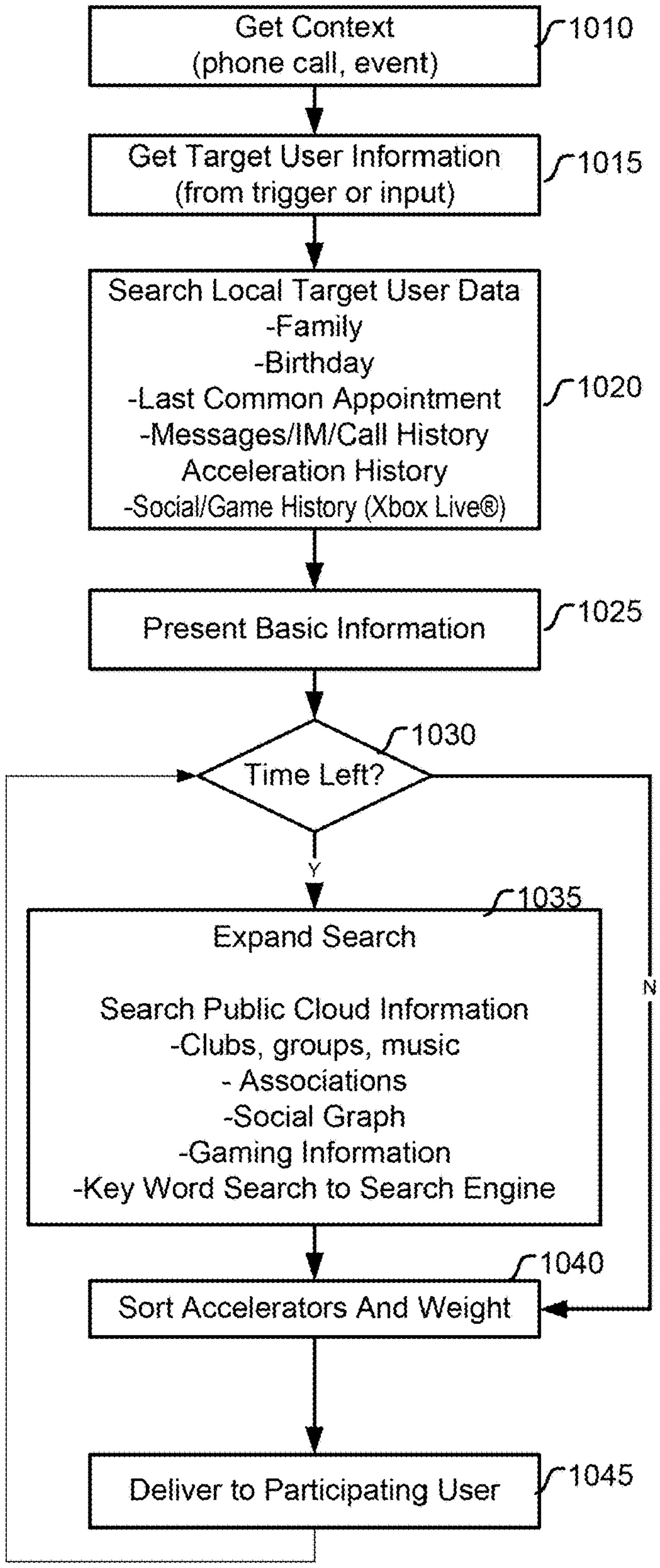
FIG. 10 illustrates a method of determining a social accelerator to avoid an awkward situation between individuals in a social interaction.

FIG. 10 illustrates a method for determining a social accelerator at 750 when the social accelerator is designed to avoid awkward situations. At 1010, the context of the social interaction is determined. In this example, the context may comprise a phone call being received by the user or presence of the user at a particular physical or on-line event. In one embodiment, the context is used in defining search criteria and sorting relevant accelerators. At 1015, target user information is retrieved. In this instance, the target user is another individual with whom the participation individual seeks to avoid an awkward situation. In a phone call, the target user may be the calling party. Target user information may be obtained from the type of trigger (e.g., from caller I.D. information and a phone call) or direct input by the participating user. At a party, the target user may be a contact identified by a requesting user via a user interface specifically provided for the interaction application. Alternative methods of determining the target user may be used, including the user of facial recognition as discussed below with respect to FIG. 17 through the use of augmented reality interfaces such as augmented reality glasses, or target user presence notifications generated by service provider such as that discussed above with respect to FIG. 8.

At 1020, a search of local target user data present on requesting participating user's device is performed. A participating user may have stored locally on the user's processing device readily available information about the target user which can be used to construct an accelerator. Such information can include the user's family information, birthday, last common appointment shared, messaging history including call history and instant messaging history, and acceleration history. The acceleration history can comprise a history of the social accelerators presented by the technology herein to the user when the participating user, a client application or a service has requested social accelerators regarding the target user previously. At 1025, a set of basic information regarding the target user retrieved as a result of the local information search may be presented. Basic information may be defined by the participating user, or by a predefined set of information pertinent to avoiding an awkward situation. This may include the target user's family information, personal information, birthday, or any other information which is input by the participating user regarding the target user.

If additional time remains 1030 to seek out information before the social interaction occurs, the search may be expanded at 1035. If not, any accelerators found at step 1020 may be sorted and provided at 1040. If an expanded search is available at 1035, public cloud information 170 may be searched for the target user interests, clubs, groups, music, associations, users in the social graph, and other information, such as gaming information. Searching of public cloud information may be performed directly by an interaction application local to the device or by the networked interaction application 810. A search at 1035 may include identifying one or more keywords, interests, associations, groups, music, social graph members or gaming information of the target user, and returning the information as a potential social accelerator. The additional information may be provided at 1040.

At step 1040, all of the different types of information available whether from the set of basic information at 1025 or from the expanded search at 1035 may be sorted according to the relevance of the particular context determined at 1010. Information may be classified into different types of accelerators having priority over other accelerators. For example, information indicating a friendship relationship from a social graph may take priority and be presented before information regarding membership in a particular club or organization. Classification can be contest dependent. For example, social graph information may be more relevant in a people matching case than in an awkwardness prevention case.

Information is then delivered to a participating user at 1045. As noted above, one example of notifying a participating user is through an application user interface 318*a* of a mobile device. Other methods of notification include using native messaging technologies of the participating user's associated processing device. In one embodiment, if time remains, the process may return to step 1030 and continue gathering information and displaying updated results as they become available. Other examples of notifying applications including an Xbox360® display screen are provided below in FIG. 13. Other notifying applications may include, for example, messaging applications, such as SMS messages, e-mails, instant messaging, verbal alerts, audio alerts, and the like. Still further examples of notifying users includes providing notifications in augmented reality devices such as augmented reality glasses and use of augmented reality interfaces in mobile devices. For example, a user can point a mobile processing device with a camera having a field of view at scene which includes target users. Using known technologies, a virtual pointer or other indicator can be presented to the user by overlaying target users or users in the field of view on the screen of a mobile processing device. Notifications can include more basic types, including a phone call to the user which verbally notifies the user of target users present through synthesized speech technologies.

Figure 11:
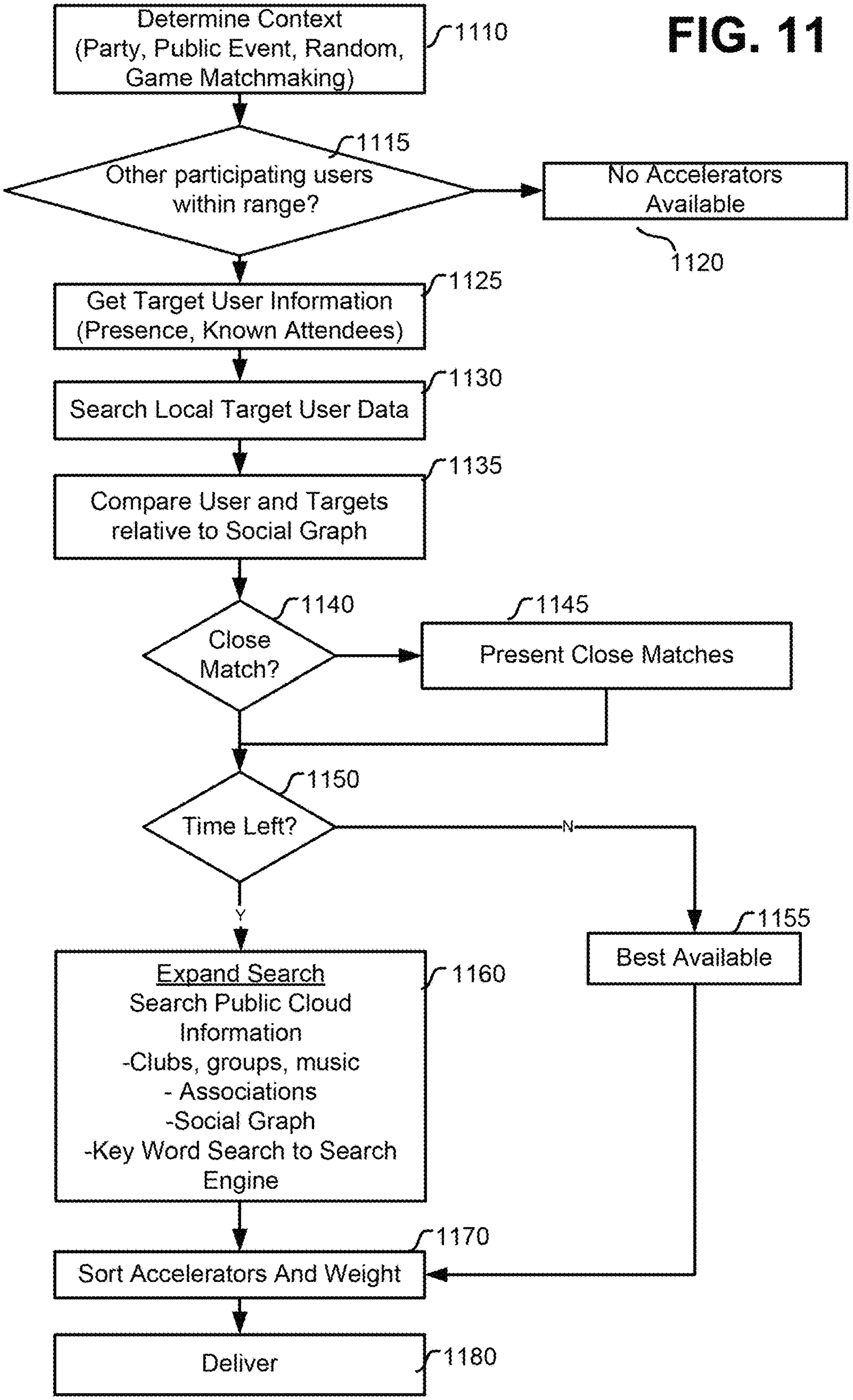
FIG. 11 is a flowchart illustrating a method of determining a social accelerator to match individuals in a social interaction.

FIG. 11 is a method for providing social accelerators in a people matching accelerator case. Examples of people matching accelerator cases include matching individuals at a group event such as a party, matching individuals at a public group event such as a concert or sporting event, matching users in a random location or online context, such as in a restaurant or chat room, and matching users wishing to play an online game. In a manner similar to the method defined above with respect to FIG. 10, at step 1110, the context of the social event is determined. In a people matching accelerator situation, the context is likely to be a party, a public event or a random meeting between individuals. For example, a user may be present in a coffee shop and wish to avoid dining alone. In this example, the user can initiate a triggering event—a request—comprising a selection to determine if other participating users are at the coffee shop, or within a particular geographical location, are available to dine and converse.

An initial determination at 1115 will be made as to whether or not participating users are present and within a particular physical range. This can include determining users who may have a client based accelerator application running on an associated processing device or determining the proximity of participating users using known associated processing devices. If not, no accelerators may be available at 1120. If other participating users are available, target user information will be determined at 1125. Target user information in this instance may be derived from known attendees at a common event, or user presence information available from interaction applications on target users' devices. An initial search will be made of local target user data at 1130. Previous conversations, previous accelerations, easy matches and events with users with whom the participating user may already have a connection may be returned at 1130. At 1135, the participating user's social graph may be navigated to determine whether or not any social relationships exist. Often, easy social acceleration can be had by reference to a commonly known individual or a third party. If a close match exists in either the local user data at 1130 or the social graph at 1135, close matches may be presented to the user at 1145. This may be performed by delivering the close matches to the target application. If no close matches are present and no time is left at 1150, then the best available matches are presented at 1155 to a sorting and weighting step 1170. The sorting step 1170 may be performed in accordance with the discussion of step 1040 in FIG. 10. If additional time is present, then the search is expanded at 1160 into public cloud information 170. An expanded search is performed in a manner similar to that described above with respect to step 1035, although, as noted above, selection of search terms, criteria, and weighting of information returned will be relevant to the people matching case and the context of the request. The algorithm looks for common interest among the various target users and the participating user and at 1170, the common interests are returned and one or more of the best rated social accelerators is selected and delivered to the delivering application at 1180.

Figure 12:
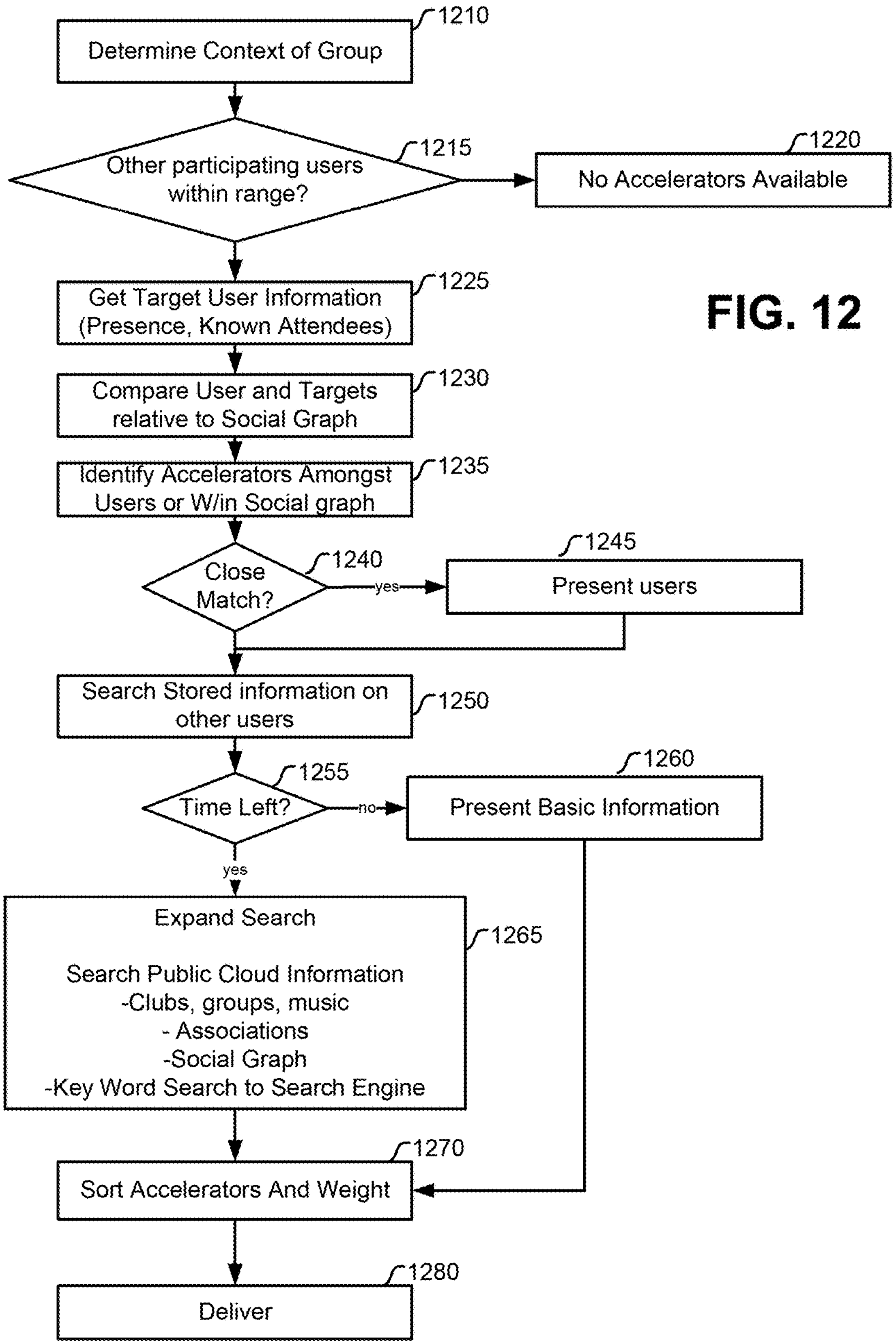
FIG. 12 is a flowchart illustrating a method of determining a social accelerator to catalyze and existing group of individuals in a social interaction.

FIG. 12 is a flow chart illustrating accelerator selection when the case involves catalyzing an existing group of individuals. An existing group may be present at a common event, or within a particular geographic location, or within a common virtual interaction. At step 1210, the context of the group is determined. The context of the group may be a common real world event, a common on-line or virtual event, such as participating in a common game, or a random event where the group is located at a common location. If a group has been organized for a particular purpose, such as to participate in a game, then the group has a context associated with the game and at least one common point of reference—that the users all like participating in the game. An initial determination is made at 1215 as to whether or not participating users are within communication range or present in a common online event. If not, no accelerators may be retrieved at 1220. In this instance, communication range may comprise a physical proximity or connection in a virtual interaction. At 1225 target user information is retrieved, including whether the users are present and whether there are known attendees in the group. At 1230, the present participating user and target users are compared relative to a social graph to see if the users have a third party user or common intersection along the social graph. At 1235, accelerators are identified among the users or within users of the social graph. At 1240, if a close match is present, then the users are presented with the close matches at 1245. At 1250, the local information on the target users is searched. Local information can be searched more quickly than other types of information and thus may return a result more quickly. If time remains at 1255 to perform an expanded search, then an expanded search is performed at 1265 in a manner similar to steps 1160 and 1035 above. If no time is left, then basic information is provided at 1260 the accelerator sorted 1270 and delivered at 1280.

Figure 13A:
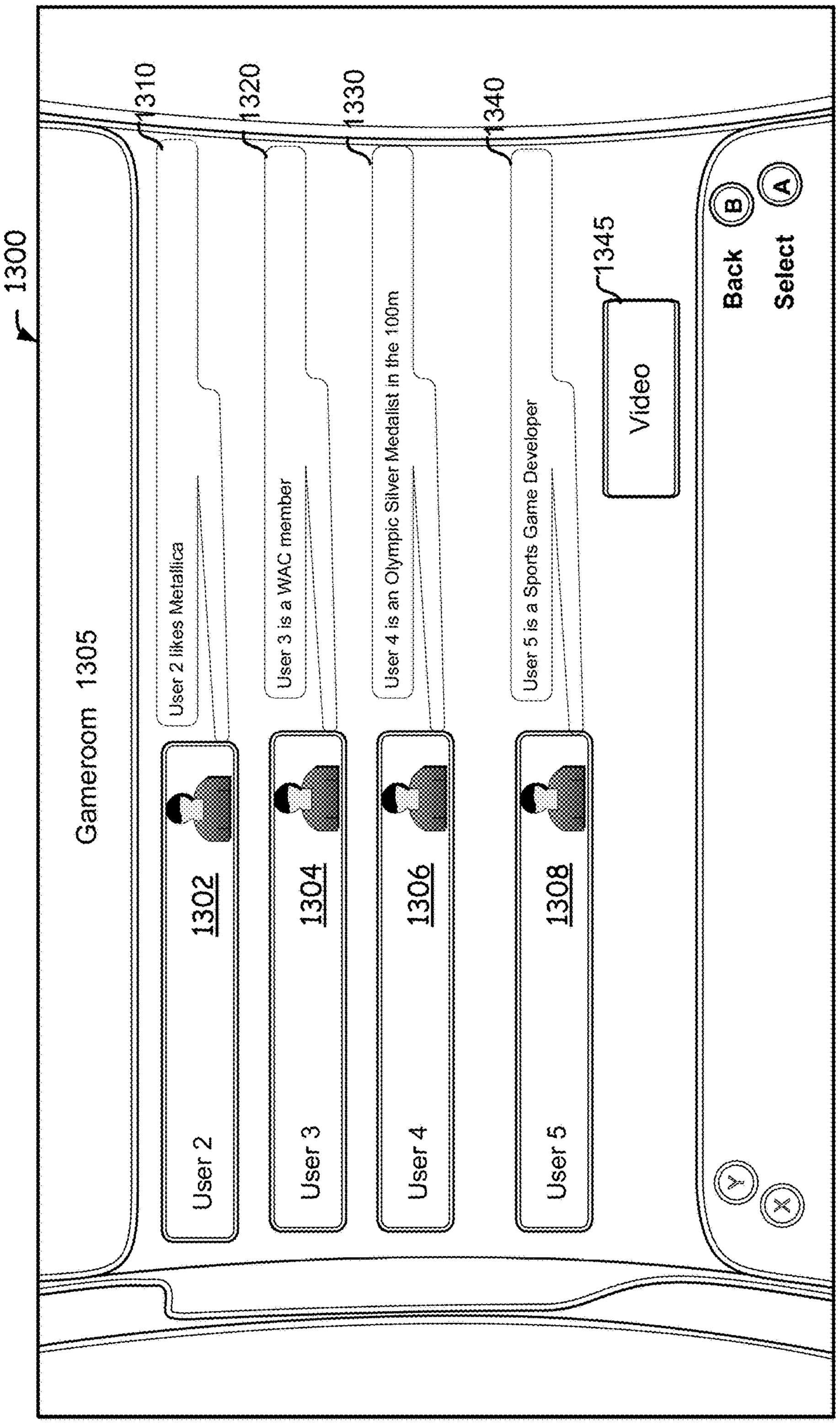
FIGS. 13A and 13B are exemplary user interfaces showing notifications provided in an Xbox 360® gaming console.
Figure 13B:
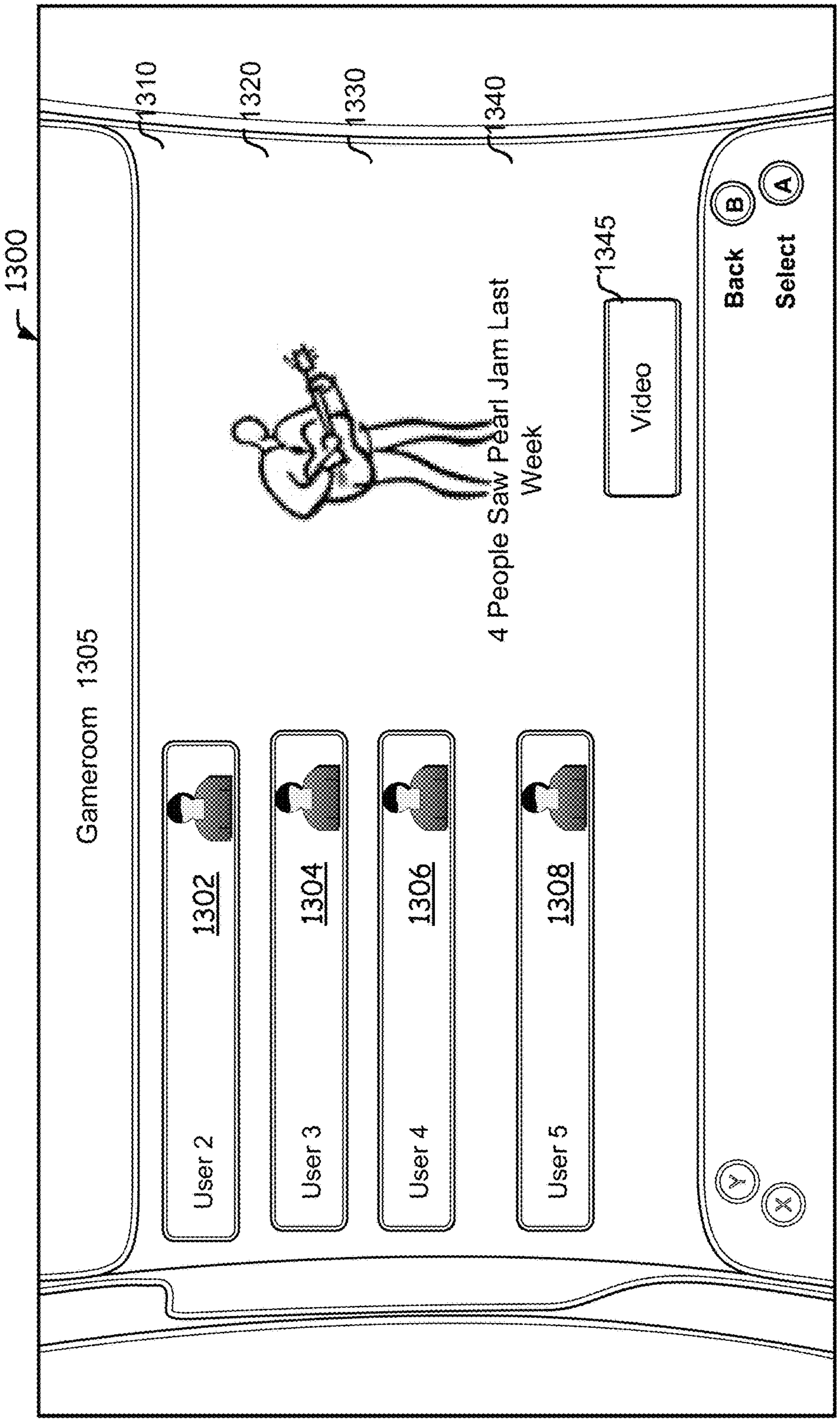

FIGS. 13A and 13B are examples of delivery of information to users via an Xbox 360® interface. An Xbox 360® interface includes a user interface 1300. In the example shown in FIG. 13A, a number of users (users 2, 3, 4 and 5) are present in a game room 1305. The game room may be hosted by one or more of the processing devices illustrated in FIG. 8, or by a third party gaming host provider, or by a gaming service provider. For each user 2, user 3, user 4, and user 5, a notification level 1310, 1320, 1330 and 1340 is shown. Each level includes information regarding the user, such as the fact that user 2 likes Metallica, user 3 is a WAC member, user 4 is an Olympic silver medalist in the marathon, and user 5 is a sports game developer. Each of these social accelerators may be provided to the user of the device to allow conversation amongst the users to be enhanced. In FIG. 13B, a single icon representing a music figure indicates that four users in the room like Metallica, in a manner similar to that shown above with respect to FIG. 7F.

In one other alternative, delivery may comprise indirectly using an accelerator to enhance interactions. For example, in a gaming room or lobby environment 1305 where multiple users are present, the users may have been placed in the game room as a result of completing a game as a group or selectively joining the room with the interest of finding others with whom to play the game. It is generally more enjoyable to participate in a game (or any other event) where one does so with others having a common interest. In some cases, during the game, certain events may have occurred, for example, music may be played in the game, social acceleration can occur when a group catalyst accelerator such as that shown in FIG. 12 determines that all the users in the game room like Metallica, and the delivery step 1280 includes providing this information to the game application, which then starts playing Metallica in the game. Likewise, or additionally, the catalyst accelerator method of FIG. 12 may determine that users 2, 3, 4 and 5 all enjoy skateboarding, and may present a skateboarding video on a video window 1245 within the display 1300. The mere presence of the music or the skateboarding video may encourage participation amongst the users and conversation using a messaging or voice chat service.

Figure 14:
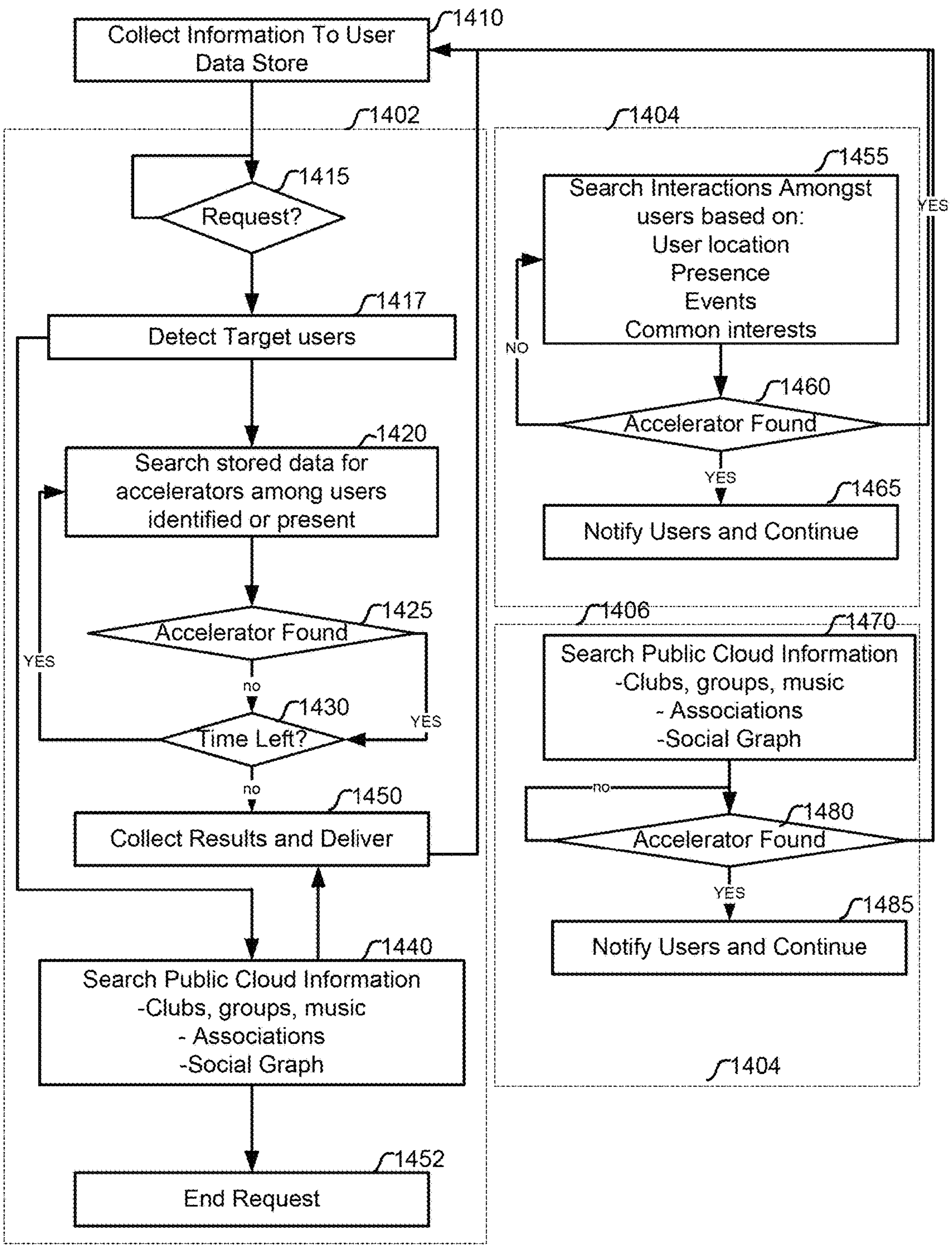
FIG. 14 is a flowchart illustrating an exemplary method performed by a server based interaction application

FIG. 14 illustrates a method which may be performed by an interaction application 810, present on an interaction data provider 850. The interaction application 810 may perform functions similar to those described above which exist on user associated processing devices, that may additionally perform additional data retrieval functions. At step 1405, the interaction application 810 may be continually collecting information to a user data store 880. Information collection may comprise polling using routines 1404 and 1406 by continually searching the respective data sources in cloud data 170 and private data 190.

In one embodiment, routines 1404 and 1406 continually search cloud based information and user data for possible trigger events and participating user interactions. At 1455, stored information is searched for possible interactions amongst participating users. Checks can be made for common events, common interests, matching data appearing on different users calendars, and the like. When matches are found, an accelerator may be determined at 1460 and respective users, a subset of users or an entire group notified at 1465. For example, two users who both attended the same college may both have an upcoming concert entered in their respective calendars. An accelerator may be created noting that the respective alums will both be at the same concert, and both users notified of this possible interaction. Similarly, routine 1406 scours cloud data for such interactions between participating users. If an accelerator is found at 1480, the users can be notified of this potential for interaction. Accelerator information and matches can be returned to the user information data store at 1410 for future use.

Routine 1402 responds to search requests from client based interaction applications. Upon receiving a request 1415 from any one of the aforementioned methods via steps 1035, 1160 or 1265, interaction application 810 may first detect which participating users are within a given proximity (real or virtual) to the requesting user at 1417. Proximity can be determined by user presence information, presence in the same game lobby, application or chat environment, or known geo-location information. In addition, based on the knowledge of the event detector and the trigger agent on the interaction application, the application may have knowledge of which users are present relative to each other at common events. At 1420 a search of the stored data 880 for accelerators amongst the target users identified by the request 1410 or which are present within the sphere of the participating user. If an accelerator is found, the results are returned at 1425. If no accelerator is found and time is left, searching may continue at 1420 and contemporaneously at 1420.

Simultaneously with steps 1420, 1425, and 1430, at 1440, the application may be continually search for accessible cloud based information. This may include searching data 170 and in addition, using key word searches of known user locations, interests and other accelerator data for information available on other data sources, such as web sites and web logs. Information found at 1460 and 1420 is returned to the application at 1450, and stored in the data store at 1410.

Figure 15:
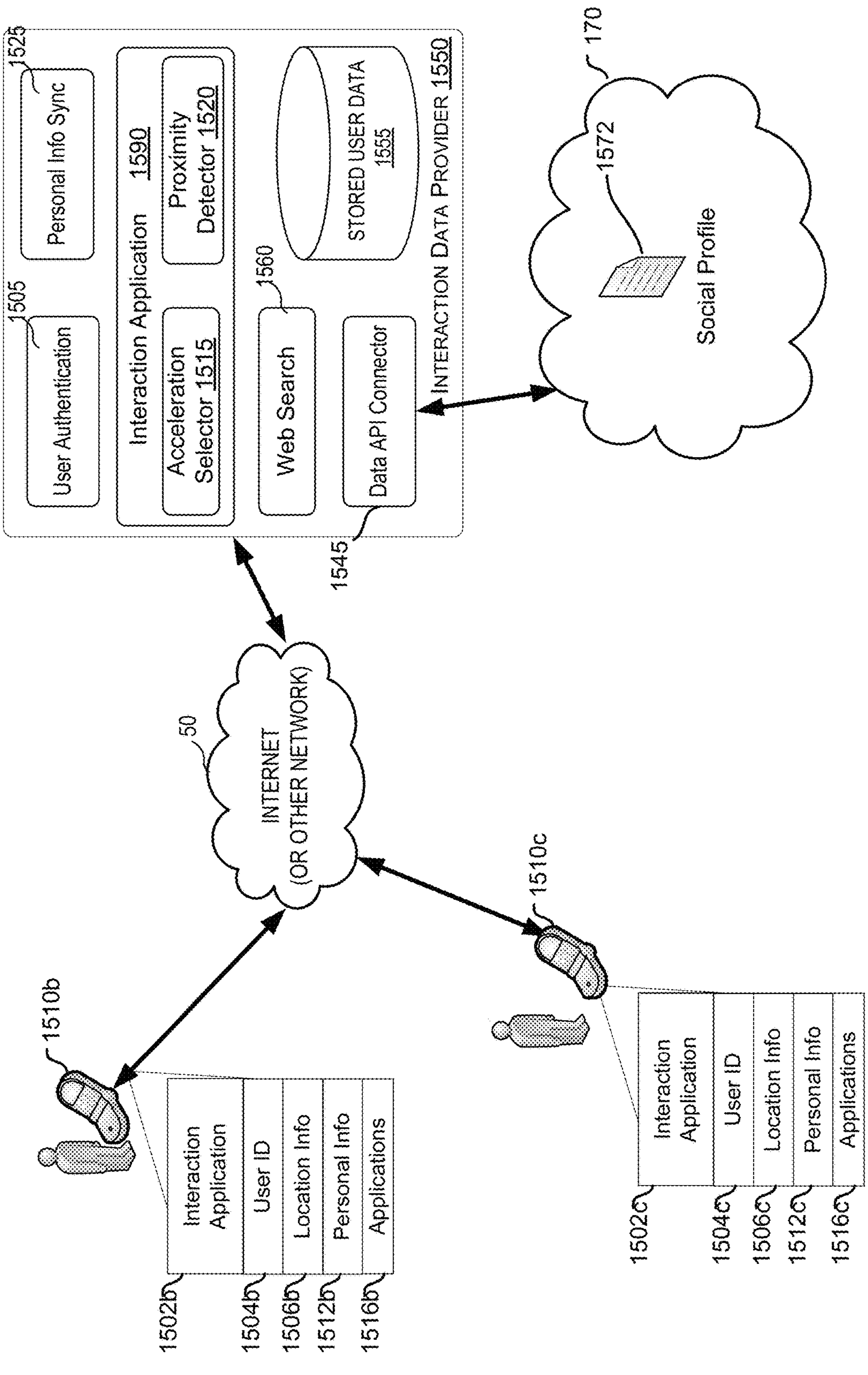
FIG. 15 illustrates a system for implementing an alternative embodiment of the technology.
Figure 16:
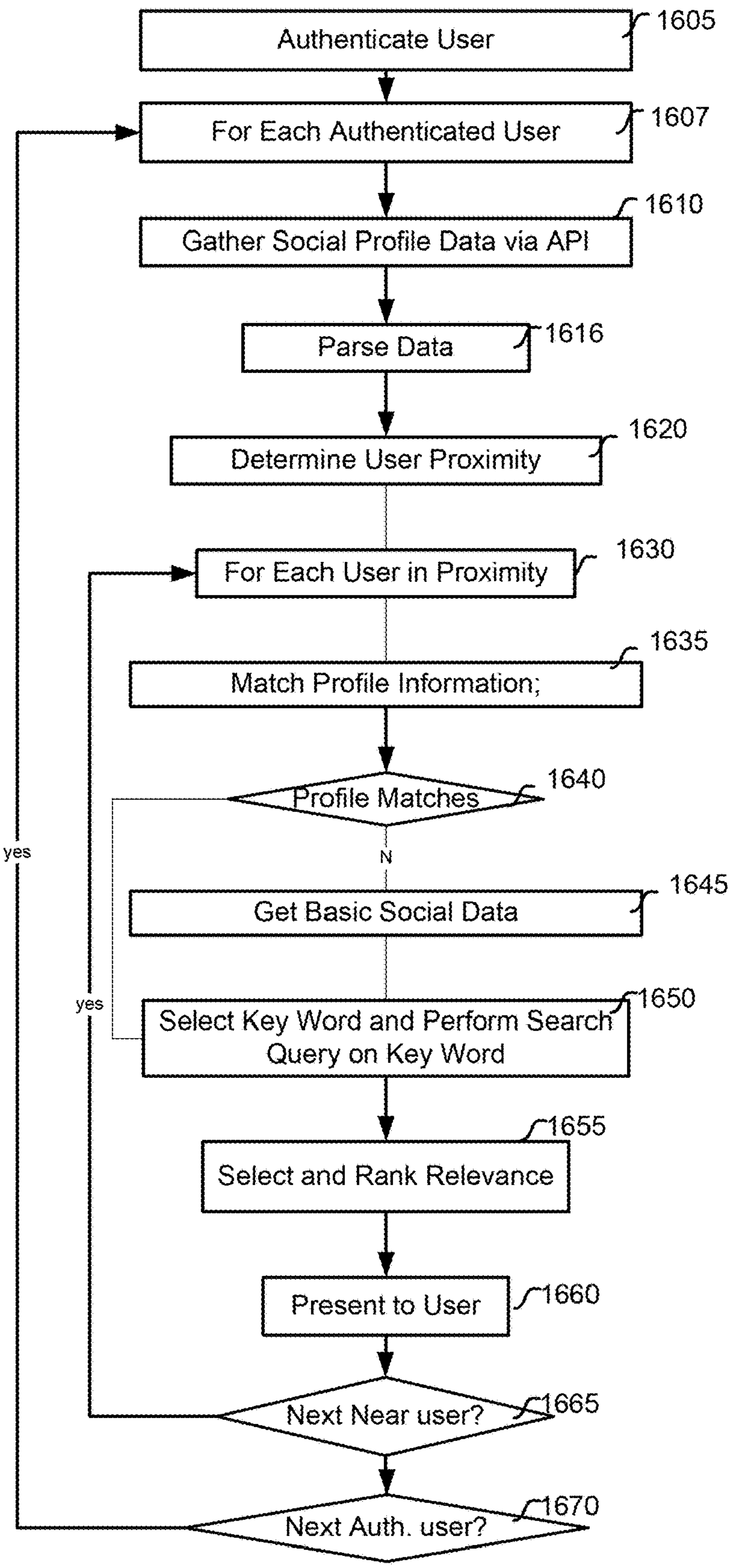
FIG. 16 is a flowchart illustrating a method performed by an interaction application in one alternative embodiment.

FIGS. 15 and 16 illustrate an alternative embodiment of the present technology wherein a network based informational service is used to provide social accelerators to mobile device users.

FIG. 15 illustrates an exemplary system including an interaction data service provider 1550 including an interaction application 1590 having an accelerator selector 1515 and a proximity detector 1520. Each device which can couple to the interaction data service provider 1550 includes an interaction application 1502*b*, 1502*c* a unique user identifier for the service 1504*b*, 1504*c* location information 1506*b*, 1506*c* personal user information 1512*b*, 1512*c* and one or more other applications 1516*b*, 1516*c* running on an associated processing device 1505*b*, 1505*c*.

A user device 1510*b* has associated therewith a specific user ID 1504*b* which is linked to unique personal information 1512*b* about the user of device 1510*b*. Any device seeking access to and accelerators from data provider 1550 must authenticate with user authentication service 1505. The user ID is linked to a personal information stored in a social profile 1572. Social profile 1572 may be provided by any of a number of social networking services, such as MySpace™, Foursquare™, Facebook® and similar services, or a social and gaming service such as Xbox Live®. Information from the social profile is synced with a user data store 1555 and the personal information 1512 of each respective user device 1510*b*, 1510*c*.

Information is retrieved from the social profile 1572 using an API connector 1545 and information in the connector which may serve as accelerator information is stored in user data 1555. In one embodiment, social profile 1572 may provide a schematized interest information which can be parsed by the interaction application and used by the acceleration selector 1515 to create social accelerators for users 1511*b* and 1511*c*. Personal information from the social profile 1572 can be synchronized with personal information 1512*b*, 1512*c* for each user on the mobile devices by synchronization agent 1525.

Interaction application 1510 may continuously receive location information from respective devices 1510*b* and 1510*c*. Interaction applications 1502*b* and 1502*c* may periodically provide location information 1506*b* and 1506*c* to the proximity detector 1520, so that information data provider 1550 is aware of the location of all authenticated users.

Using the location information, acceleration selector can automatically provide information to users 1511*b*, and 1511*c* regarding other authenticated users having a real world proximity to them with social accelerators. In one embodiment, the social accelerators may comprise information from the static profile which matches one or more interests identified in the user's personal information and social profile. In this embodiment, specific requests from each interaction application 1502*b*, 1502*c* need not be required. Social accelerators may be generated automatically by interaction application 1590 when the proximity detector finds a proximity relationship between authenticated users.

A web search connector 1560 may be utilized to initiate query requests to one or more World Wide Web search engines, such as Bing, Google, Yahoo and the like, and return additional information for use in creating social accelerators by accelerator selector 1515.

FIG. 16 illustrates a method performed by the interaction application 1510. Users are authenticated at 1605. As part of the authentication process, users may be required to associate their User ID with authentication credentials for their social profile, allowing the information provider 1550 to access information in the social profile. For each authenticated user at 1607, using an API at 1610, the social profile of authenticated users is accessed, and parsed at 1616. At 1620, using the location information in each device (for example devices 1510*b*, 1510*c*), other authenticated users who are near in proximity to the authenticated user are determined. Proximity may be defined by the user or by the information service provider 1550. For each near user in proximity at 1630, the near user's social profile information is compared with the authenticated users profile information at 1635. If a match is found at 1640, optionally at 1650, key word searching using one or more search engines may be performed to retrieve additional data based on the matched in the profile. If no matches between the profile are found, basic information about the near user may be gathered 1645 and, optionally, step 1655 performed.

Once all information has been retrieved, matching, search information and/or basic information is ranked and presented to the authenticated user at 1660. The method continues for each user in the proximity at 1665 and each authorized user 1670. In one example, two users in proximity may have no social matching information and no key word searching is performed. In this instance, an authenticated user will be provided with basic information such as a username and "public" information which any near user has agreed to publish without restriction. In another example, matches between the social profiles may indicate common employers, schools, events or specified interests. Such information may be presented in a manner similar to FIG. 7D.

Figure 17:
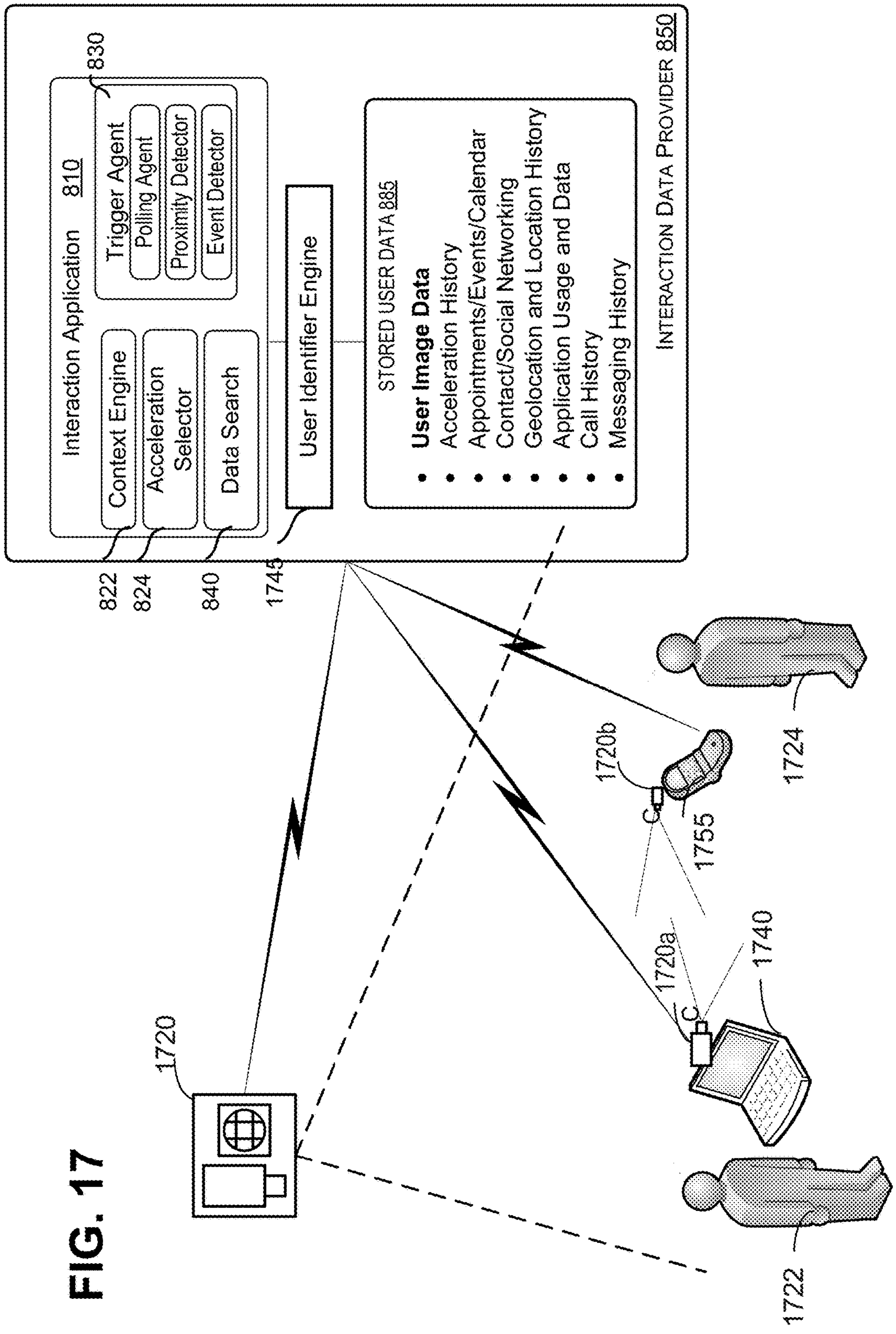
FIG. 17 illustrates a system for implementing another alternative of the technology.

FIG. 17 illustrates a system for implementing the present technology using one or more facial recognition systems as triggers. In FIG. 17, the interaction data provider may comprise any one or more of the systems illustrated in FIGS. 6A, 6B and 8. In the system 850*a* illustrated in FIG. 17, a user identification engine 1745 is provided. Identification engine 1745 received trigger events from the trigger ag3ent 830, for example, which may comprise image data of a field of view including users 1722 and 1724. The identification engine 1745 uses image data provided by one or more of a common imaging device 1720 or one or more user imaging devices 1720*a*, 1720*b* which may be associated with user processing devices 1740 and 1750 to capture users within the presence of the respective devices. A common imaging device 1720 may be provided by a participating user at a party or in a common establishment such as a restaurant or coffee house. Users 1722 or 1724 may use cameras 1720*a*, 1720*b* on respective processing devices 1740, 1755 to scan a field of view when the user enters a room.

User identification module 1745 uses stored user data, such as user contact data, social networking information (including, for example, a user profile and profile picture) to identify potential target users in the scene and process social accelerators in accordance with any one or more of the methods discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for facilitating a social interaction between a participating user and a target user, the method comprising:
- aggregating interest information about the participating user and the target user to generate aggregated interest information;
- receiving an indication that an upcoming event results in a probability of the social interaction occurring between the participating user and the target user;
- determining a social interaction context for the social interaction between the participating user and the target user, wherein determining the social interaction context comprises:

evaluating a plurality of event characteristics, assigning a weight to individual event characteristics of the plurality of event characteristics to define assigned weights, and summing the assigned weights to classify the social interaction context;

analyzing the aggregated interest information to identify a social accelerator for facilitating the social interaction between the participating user and the target user, the social accelerator indicating at least one common interest that the participating user and the target user share in common;

determining a commencement time at which the upcoming event is scheduled to begin; and prior to the commencement time, transmitting the social accelerator to a computing device that is associated with the participating user.

2. The method of claim 1, wherein the aggregating includes at least one of:

aggregating first personal information about the target user that is previously known to the participating user;

aggregating second personal information that is published about the target user by the target user;

aggregating publicly available information about the target user; and aggregating private personal information made available by the target user for use in identifying the social accelerator.

3. The method of claim 1, wherein the upcoming event comprises one of a real world event or an online event.

4. The method of claim 1, wherein the social interaction comprises at least one of:

between the participating user and the target user:

a personal meeting, a virtual meeting, a pre-arranged event; a spontaneous event; a phone call, a message, participation in a common on-line event, participation in a common group event, entering a group play application, exiting the group play application; or a request by an application executed by the target user for the social accelerator.

5. The method of claim 1, further comprising determining an accelerator selection case based on contexts of a particular social interaction of a plurality of the social interactions, wherein the determining the accelerator selection case comprises at least one of:

selecting the particular social interaction to avoid an awkward interaction between the participating user and the target user;

selecting the particular social interaction to create an interest match between the participating user and the target user; or selecting the particular social interaction to catalyze discussion amongst a group of users including the participating user and the target user.

6. The method of claim 1, wherein the at least one common interest includes at least one of common or related: social relationships, expertise, historical events, or current events.

7. A method for facilitating a social interaction between a first user and at least one user of a group of other users, the method comprising:

collecting user information about the first user and the at least one user of the group of other users;

receiving an indication of an upcoming event that results in a potential for a social interaction to occur between the first user and the at least one user of the group of other users;

determining a social interaction context for the social interaction between the first user and the at least one user of the group of other users by:

evaluating a plurality of event characteristics, assigning a weight to individual event characteristics of the plurality of event characteristics to define assigned weights, and summing the assigned weights to classify the social interaction context;

identifying a social accelerator from the user information, the social accelerator based on the social interaction context and a portion of the user information that is common to the first user and the at least one user of the group of other users; and providing the social accelerator to the first user prior to a commencement time of the upcoming event to advance the social interaction during the upcoming event.

8. The method of claim 7, wherein the providing the social accelerator includes providing the social accelerator to the at least one user of the group of other users.

9. The method of claim 8, wherein the social accelerator comprises at least one of:

commonalities between the first user and the at least one user of the group of other users;

a group recommendation of a common interest, a common topic, or a common activity; or shared contact information.

10. The method of claim 9, wherein the collecting includes:

storing a first subset of the user information in a data store, and selecting the first subset of the user information from the data store.

11. The method of claim 10, wherein the collecting further includes searching network accessible information published by the at least one user of the group of other users.

12. The method of claim 10 wherein, the providing includes providing the social accelerator to an application executed by a computing device that is associated with the first user, the application responding to the social accelerator to alter an element of the application to reflect the social accelerator within the application to the first user prior to the commencement time of the upcoming event.

13. The method of claim 12, wherein the method further includes notifying the first user, and wherein the identifying the social accelerator comprises matching one or more common or related: social relationships, interests, expertise, historical events, or current events.

14. The method of claim 13, wherein the notifying includes at least one of:

displaying on a user device interface an indicator of the social accelerator and the first user and the at least one user of the group of other users matching the social accelerator;

displaying on the user device interface known information about the at least one user of the group of other users; or displaying on the user device interface a conversational topic between the first user and the at least one user of the group of other users.

15. A method for facilitating a social interaction between a first user and a second user, comprising:

aggregating interest information about the first user and the second user to generate aggregated interest information;

receiving an indication of an upcoming event during which the social interaction between the first user and the second user may potentially occur;

determining a social interaction context for the social interaction between the first user and the second user by:

evaluating a plurality of event characteristics, assigning a weight to individual event characteristics of the plurality of event characteristics to define assigned weights, and summing the assigned weights to classify the social interaction context;

analyzing the aggregated interest information to select a social accelerator for enabling the social interaction, wherein the social accelerator indicates a portion of the interest information that the first user and the second user share in common; and causing a computing device that is associated with the first user to display the social accelerator prior to the upcoming event, or during the upcoming event, or both.

16. The method of claim 15, wherein the aggregating includes at least one of:

aggregating first personal information about the second user that is previously known to the first user;

aggregating second personal information that is published about the second user by the second user;

aggregating publicly accessible information about the second user; and aggregating private personal information made available by the second user.

17. The method of claim 15, wherein the upcoming event comprises a real world event or an online event.

18. The method of claim 15, wherein the upcoming event comprises at least one of the following between the first user and the second user:

a personal meeting, a virtual meeting, a pre-arranged event; a spontaneous event; a phone call; a message; participation in a common on-line event; participation in a common group event;

entering a group play application;

exiting the group play application; or a request by an application executed by at least one second user for the social accelerator.

19. The method of claim 15, further comprising determining an accelerator selection case based on the social interaction context, wherein the accelerator selection case comprises at least one of:

selecting a particular social interaction to avoid an awkward interaction between the first user and the second user;

selecting the particular social interaction to create an interest match between the first user and the second user; or selecting the particular social interaction to catalyze discussion amongst a group of users including the first user and the second user.

20. The method of claim 15, wherein the selecting the social accelerator comprises matching one or more common: social relationships, interests, expertise, historical events, or current events.

21. A method for facilitating a social interaction between a first user and a second user, comprising:

aggregating interest information about the first user and the second user to generate aggregated interest information;

receiving an indication of a potential for a social interaction to occur between the first user and the second user;

determining a social interaction context of a plurality of social interaction contexts, the social interaction context defining how the social interaction is to take place, wherein determining the social interaction context comprises:

evaluating a plurality of event characteristics, assigning a weight to each of the plurality of event characteristics to define assigned weights, and using the assigned weights of the plurality of event characteristics to classify the social interaction context;

selecting a social accelerator to advance the social interaction based on the social interaction context, the social accelerator comprising at least a portion of the aggregated interest information that the first user and the second user share in common; and providing the social accelerator to the first user prior to a commencement time of the social interaction between the first user and the second user.

22. The method of claim 21, wherein the aggregating includes at least one of:

aggregating first personal information about the second user that is previously known to the first user;

aggregating second personal information that is published about the second user by the second user;

aggregating publicly accessible information about the second user; and aggregating private personal information made available by the second user.

23. The method of claim 21, wherein the social interaction comprises one of a real world event or an online event.

24. The method of claim 21, wherein the social interaction comprises at least one of the following between the first user and the second user:

a personal meeting, a virtual meeting, a pre-arranged event; a spontaneous event; a phone call; a message; participation in a common on-line event; participation in a common group event; or entering a group play application; or exiting the group play application; or a request by an application executed by at least one second user for the social accelerator.

25. The method of claim 21, further comprising at least one of:

selecting an accelerator selection case to avoid an awkward interaction between the first user and the second user;

selecting the accelerator selection case to create an interest match between the first user and the second user; or selecting the accelerator selection case to catalyze discussion amongst a group of users including the first user and the second user.

26. The method of claim 21, wherein the selecting the social accelerator comprises matching one or more common or related: social relationships, interests, expertise, historical events, or current events.

* * * * *